US009508231B2

(12) United States Patent
Hosokawa et al.

(10) Patent No.: US 9,508,231 B2
(45) Date of Patent: Nov. 29, 2016

(54) BANKNOTE PAY-IN/PAY-OUT DEVICE AND BANKNOTE TRANSACTION DEVICE

(71) Applicant: Oki Electric Industry Co., Ltd., Tokyo (JP)

(72) Inventors: Kazuhiro Hosokawa, Tokyo (JP); Kei Iwatsuki, Tokyo (JP); Madoka Wakabayashi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 14/906,372

(22) PCT Filed: May 19, 2014

(86) PCT No.: PCT/JP2014/063253
§ 371 (c)(1),
(2) Date: Jan. 20, 2016

(87) PCT Pub. No.: WO2015/037276
PCT Pub. Date: Mar. 19, 2015

(65) Prior Publication Data

US 2016/0163160 A1 Jun. 9, 2016

(30) Foreign Application Priority Data

Sep. 13, 2013 (JP) ................................ 2013-190585

(51) Int. Cl.

| | |
|---|---|
| ***G06Q 40/00*** | (2012.01) |
| ***G07D 11/00*** | (2006.01) |
| ***G07F 19/00*** | (2006.01) |

(52) U.S. Cl.
CPC ......... *G07F 19/202* (2013.01); *G07D 11/0018* (2013.01); *G07D 11/0033* (2013.01); *G07D 11/0084* (2013.01); *G07F 19/203* (2013.01)

(58) Field of Classification Search
CPC ...... G06Q 40/00; G07D 11/00; G07F 19/00; G07F 7/00; G06K 7/04; G06K 13/00; G06K 13/06; G06K 13/24; G06K 19/00
USPC ....... 235/379, 376, 446, 485, 483, 475, 487; 194/206; 705/35
See application file for complete search history.

(56) References Cited

U.S. PATENT DOCUMENTS

| | | | |
|---|---|---|---|
| 6,422,458 | B1 | 7/2002 | Katou et al. |
| 2002/0088850 | A1 | 7/2002 | Katou et al. |

(Continued)

FOREIGN PATENT DOCUMENTS

| | | | |
|---|---|---|---|
| JP | 2000-020783 | A | 1/2000 |
| JP | 2008-027023 | A | 2/2008 |

(Continued)

*Primary Examiner* — Edwyn Labaze
(74) *Attorney, Agent, or Firm* — Rabin & Berdo

(57) ABSTRACT

An automated teller machine includes: a customer interface that receives operation relating to banknotes; a pay-in/pay-out port section that takes in banknotes from the outside and dispenses banknotes to the outside; a classification section that classifies the banknotes; a front conveyance section that conveys the banknotes between the pay-in/pay-out port section and the classification section; banknote storage boxes that are provided below the classification section, and that store normal banknotes determined to be normal by the classification section from out of the banknotes inserted into the pay-in/pay-out port section; a sorting conveyance section that is provided below the classification section, that sorts the normal banknotes into the banknote storage boxes according to denomination, and that retains a pay-in reject banknote determined to be unsuitable for pay-in by the classification section; and a rear conveyance section that conveys the banknotes between the classification section and the sorting conveyance section.

18 Claims, 28 Drawing Sheets

(56) References Cited

U.S. PATENT DOCUMENTS

2002/0092905 A1 7/2002 Katou et al.
2002/0170956 A1 11/2002 Katou et al.
2003/0205618 A1 11/2003 Katou et al.
2004/0182677 A1 9/2004 Katou et al.
2006/0070840 A1* 4/2006 Hayashi ................ B65H 9/166 194/206
2006/0090983 A1 5/2006 Katou et al.
2007/0221469 A1 9/2007 Katou et al.
2009/0008215 A1* 1/2009 Bell ........................ G07D 3/14 194/342
2009/0085274 A1 4/2009 Katou et al.
2009/0152805 A1* 6/2009 Nomiyama ............ B65H 1/025 271/227
2010/0100245 A1* 4/2010 Oishi .................. B65H 29/006 700/275
2010/0164161 A1 7/2010 Katou et al.
2011/0155536 A1 6/2011 Togiya et al.
2014/0326575 A1 11/2014 Nemoto

FOREIGN PATENT DOCUMENTS

JP 2011-002912 A 1/2011
JP 2013-125310 A 6/2013

* cited by examiner

BANKNOTE PAY-IN/PAY-OUT DEVICE AND BANKNOTE TRANSACTION DEVICE

TECHNICAL FIELD

The present invention relates to a banknote pay-in/pay-out device and a banknote transaction device, and is, for example, well-suited to application to a banknote pay-in/pay-out device incorporated into an automated teller machine.

BACKGROUND ART

Banknote pay-in/pay-out devices that perform banknote pay-in and pay-out processing are incorporated into conventional automated teller machines. Banknote pay-in/pay-out devices are, for example, configured by a pay-in/pay-out port section that exchanges banknotes with a user, a classification section that classifies the denomination and authenticity of inserted banknotes, a temporary holding section that temporarily holds inserted banknotes, banknote storage boxes that store banknotes by denomination, and a conveyance path connecting these sections together.

Such banknote pay-in/pay-out devices perform processing to count inserted banknotes when a user has inserted banknotes into the pay-in/pay-out port section during pay-in. In this count processing, the banknote pay-in/pay-out device feeds out the inserted banknotes one note at a time through a feed-out port in the pay-in/pay-out port section to be classified by the classification section. When a banknote is determined to be a normal banknote as the classification result, the banknote is stored in the temporary holding section and counted. However, when a banknote is determined to be a pay-in reject banknote, this being a banknote that is unsuitable for pay-in, the banknote is replaced in the pay-in/pay-out port section through a collection port provided to the pay-in/pay-out port section separately to the feed-out port, to be returned to the user (see, for example, Japanese Patent Application Laid-Open (JP-A) No. 2011-2912).

Then, on confirmation of the pay-in amount by the user, the banknote pay-in/pay-out device determines the normal banknotes stored in the temporary holding section again in the classification section, before holding the banknotes by denomination in the respective banknote storage boxes.

SUMMARY OF INVENTION

Technical Problem

However, such banknote pay-in/pay-out devices include a conveyance path connecting together the feed-out port and the collection port of the pay-in/pay-out port section, and there are concerns regarding the complexity of the mechanism.

In consideration of the above circumstances, the present invention proposes a banknote pay-in/pay-out device and a banknote transaction device enabling a simpler mechanism.

Solution to Problem

In order to address the above issue, a banknote pay-in/pay-out device of the present invention includes a pay-in/pay-out port section that takes in banknotes from the outside and dispenses banknotes to the outside; a classification section that classifies the banknotes; a first conveyance section that conveys the banknotes between the pay-in/pay-out port section and the classification section; banknote storage boxes that are provided below the classification section, and that store normal banknotes determined to be normal by the classification section from out of the banknotes inserted into the pay-in/pay-out port section; a sorting conveyance section that is provided below the classification section, that sorts the normal banknotes into the banknote storage boxes according to denomination, and that retains a pay-in reject banknote determined to be unsuitable for pay-in by the classification section; and a second conveyance section that conveys the banknotes between the classification section and the sorting conveyance section.

This banknote pay-in/pay-out device provides the pay-in/pay-out port section with a common feed-out port and collection port, simplifies the conveyance path, and enables temporary retention in which pay-in reject banknotes are conveyed to the sorting conveyance section without being conveyed to the pay-in/pay-out port section.

A banknote transaction device of the present invention includes a customer interface that receives operation relating to banknotes; a pay-in/pay-out port section that takes in banknotes from the outside and dispenses banknotes to the outside; a classification section that classifies the banknotes; a first conveyance section that conveys the banknotes between the pay-in/pay-out port section and the classification section; banknote storage boxes that are provided below the classification section, and that store normal banknotes determined to be normal by the classification section from out of the banknotes inserted into the pay-in/pay-out port section; a sorting conveyance section that is provided below the classification section, that sorts the normal banknotes into the banknote storage boxes according to denomination, and that retains a pay-in reject banknote determined to be unsuitable for pay-in by the classification section; and a second conveyance section that conveys the banknotes between the classification section and the sorting conveyance section.

This banknote transaction device provides the pay-in/pay-out port section with a common feed-out port and collection port, simplifies the conveyance path, and enables temporary retention in which pay-in reject banknotes are conveyed to the sorting conveyance section without being conveyed to the pay-in/pay-out port section.

Advantageous Effects of Invention

The present invention provides the pay-in/pay-out port section with a common feed-out port and collection port, simplifies the conveyance path, and enables temporary retention in which pay-in reject banknotes are conveyed to the sorting conveyance section without being conveyed to the pay-in/pay-out port section. Accordingly, the present invention enables a banknote pay-in/pay-out device and a banknote transaction device capable of a simpler mechanism.

DESCRIPTION OF EMBODIMENTS

Detailed explanation follows regarding exemplary embodiments of the present invention, with reference to the drawings.

1. First Exemplary Embodiment

1-1. Automated Teller Machine Configuration

Figure 1:
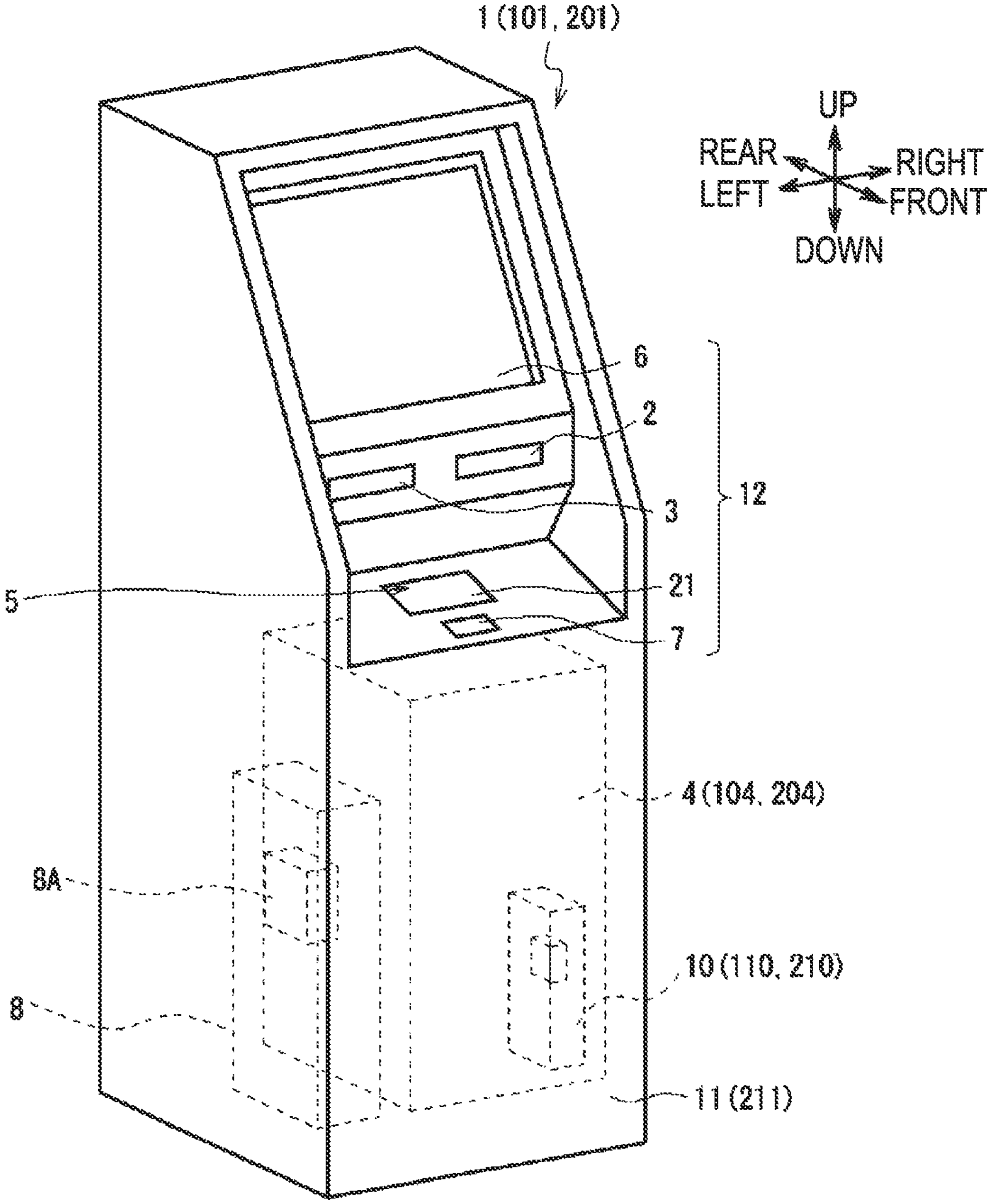
FIG. 1 is a perspective view illustrating a configuration of an automated teller machine.

As illustrated in the external view of FIG. 1, an automated teller machine 1 is configured around a box shaped casing 11, and performs processing related to cash deposits, withdrawals, and transfers according to operation by a user using transaction media such as cash cards, banknotes, and transaction slips.

The casing 11 is configured with a diagonally cut-away shape at a location enabling easy insertion of banknotes and easy operation of a touch panel by a user facing the front side of the casing 11, namely at a portion spanning from a front face upper portion to the top face, with a customer interface 12 provided at this portion.

The customer interface 12 is provided with a card insertion/removal port 2, a receipt issue port 3, a ten-key 7, an operation and display section 6, and a pay-in/pay-out port section 21. The customer interface 12 directly handles, for example, cash and passbook transactions with the user, and notifies transaction-related information and receives operation instructions.

A card processor (not illustrated in the drawings) for processing cash cards and the like belonging to the user, and a receipt printer (not illustrated in the drawings) for printing a receipt to be issued to the user are provided in an upper internal section of the automated teller machine 1.

The card processor processes a user cash card inserted into the card insertion/removal port 2, and the receipt printer dispenses a transaction slip to the user through the receipt issue port 3.

A banknote pay-in/pay-out device 4 that processes banknotes is provided in a lower internal section of the automated teller machine 1. The pay-in/pay-out port section 21 into which the user inserts banknotes to be paid in, and that dispenses banknotes to be paid out to a user, is provided at an upper front face portion of the banknote pay-in/pay-out device 4. The pay-in/pay-out port section 21 is opened and closed by driving a pay-in/pay-out port shutter 5.

The operation and display section 6 is integrated with a Liquid Crystal Display (LCD) that displays operation screens during transactions, and a touch panel that is input with, for example, a transaction type selection, a PIN, and a transaction amount.

The ten-key 7 is a physical keypad that is input with the numbers 0 to 9. The ten-key 7 is employed during input operation for PINs, transaction amounts, and the like.

A main controller 8 that performs overall control of the automated teller machine 1 and controls each of the sections described above, and a memory section 8A that stores operational information and the like of the automated teller machine 1, are provided inside the casing 11.

A controller 10 that controls the banknote pay-in/pay-out device 4, and a memory section (not illustrated in the drawings) configuring a memory region of the controller 10 are provided inside the banknote pay-in/pay-out device 4. The controller 10 reads a specific program from the memory section and performs pay-in count processing, pay-in reject banknote withholding processing, storage processing, pay-out transaction processing, and pay-out banknote withholding processing, described later.

In the following explanation of the automated teller machine 1, the front side is defined as the side facing the user, and the opposite side thereto is defined as the rear side. The left side, right side, upper side and lower side are respectively defined from the perspective of left and right as seen by a user facing the front side.

1-2. Banknote Pay-In/Pay-Out Device Configuration

Figure 2:
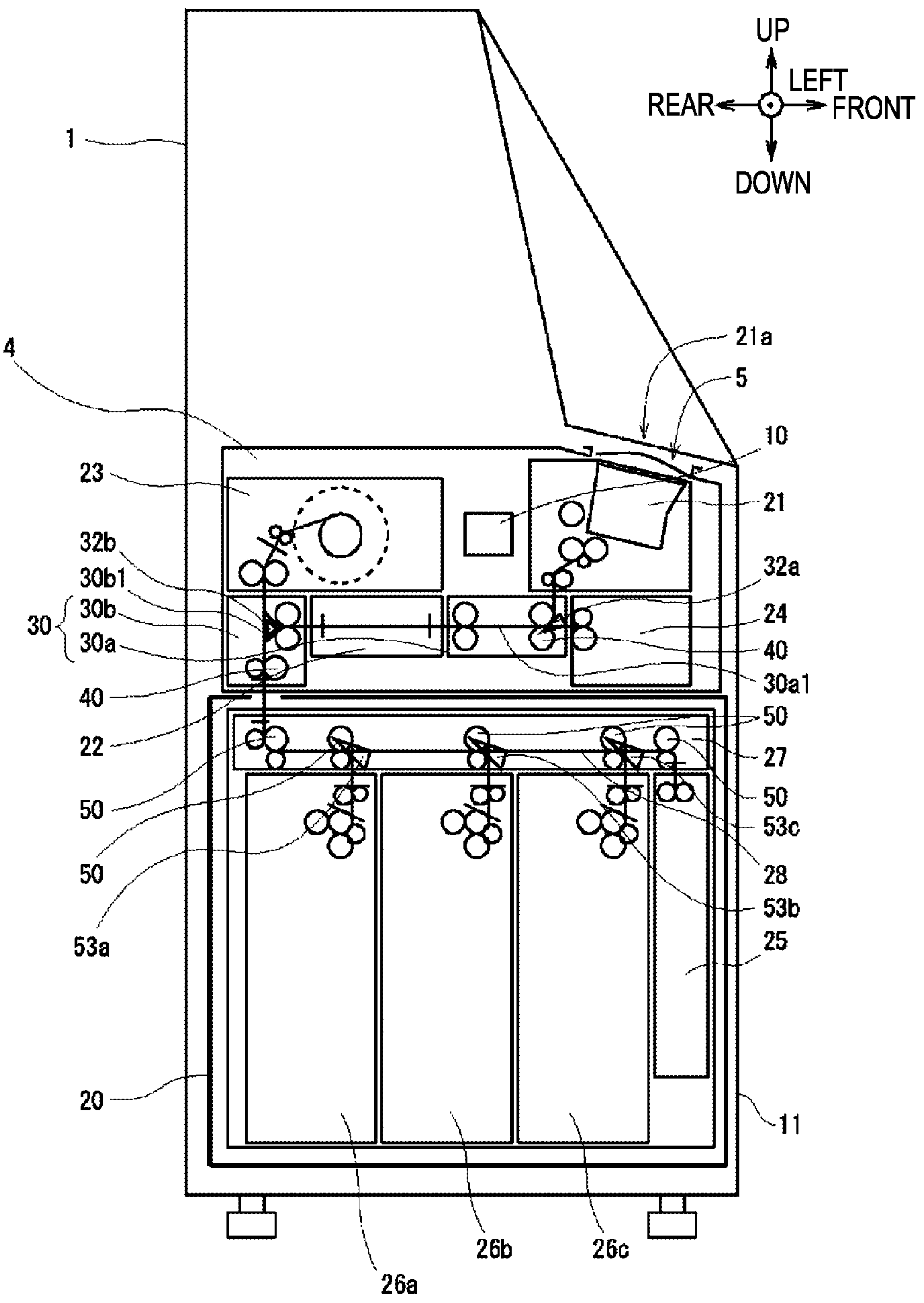
FIG. 2 is a left side view illustrating a configuration of a banknote pay-in/pay-out device in a first exemplary embodiment.

As illustrated in FIG. 2, the pay-in/pay-out port section 21 through which the user inserts and removes banknotes is installed at an upper front face of the banknote pay-in/pay-out device 4. A pay-in/pay-out port 21*a* of the pay-in/pay-out port section 21 is provided with the pay-in/pay-out port shutter 5 mentioned above.

The banknote pay-in/pay-out device 4 exposes the pay-in/pay-out port section 21 at the front face of the automated teller machine 1 by opening the pay-in/pay-out port shutter 5, allowing a user to insert banknotes and remove banknotes.

A classification section 22 that extracts banknote features one note at a time and determines the authenticity, physical condition, denomination, serial number, quantity, conveyance state, and the like of the banknotes is installed to the lower rear side of the pay-in/pay-out port section 21.

A temporary holding section 23 that temporarily looks after banknotes paid in by a user until a transaction is finalized is installed to the rear of the pay-in/pay-out port section 21 and above the classification section 22. The temporary holding section 23 is what is known as a tape winding type, and stores a large number of banknotes by gripping the banknotes aligned along their short edge direction between tapes that are wound onto specific reels and wrapping them sequentially onto a circular cylinder shaped drum. The temporary holding section 23 discharges and feeds out stored banknotes to the outside by rotating the drum in the opposite direction to that during storage while winding the tape onto the respective specific reels.

A conveyance section 30 configured by a front conveyance section 30*a* including a front conveyance path 30*a*1 that is connected to a front side of the classification section 22 and extends in a straight line in the front-rear direction, and a rear conveyance section 30*b* including a rear conveyance path 30*b*1 that is connected to a rear side of the classification section 22 and extends in a straight line in the up-down direction across a three-way branch portion, is provided in front of and behind the classification section 22.

The front conveyance section 30*a* includes plural conveyance rollers 40 disposed facing each other across the front conveyance path 30*a*1, and a conveyance guide (not illustrated in the drawings) provided along the front conveyance path 30*a*1. The front conveyance section 30*a* conveys banknotes in both directions by rotating the conveyance rollers 40 in the desired direction using a motor, not illustrated in the drawings.

Figure 3:
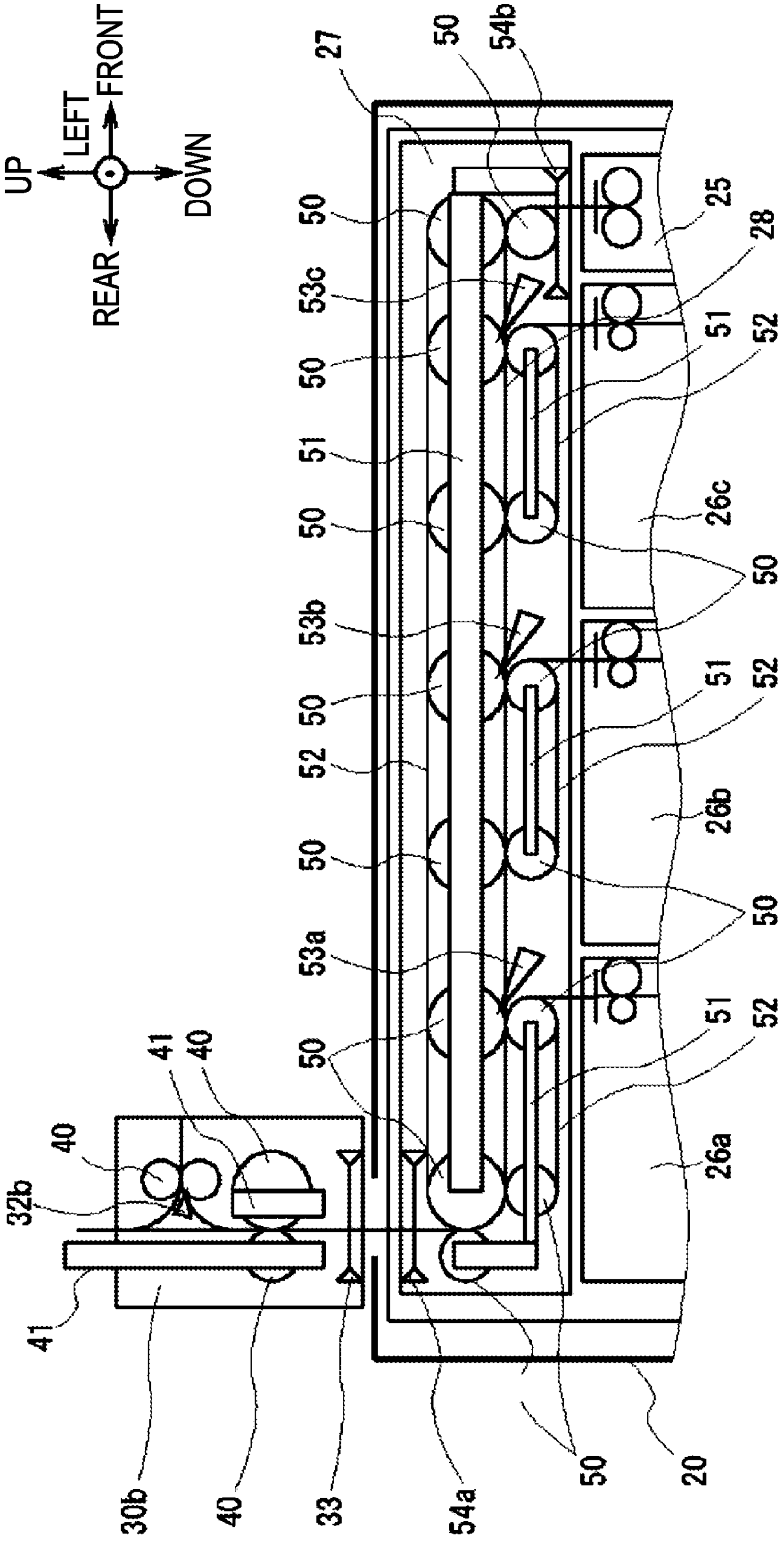
FIG. 3 is a left side view illustrating configuration of a rear conveyance section and a sorting conveyance section in the first exemplary embodiment.

The rear conveyance section 30*b* includes plural conveyance rollers 40 disposed facing each other across the rear conveyance path 30*b*1, and a conveyance guide, illustrated in FIG. 3, provided along the rear conveyance path 30*b*1. The rear conveyance section 30*b* conveys banknotes in both directions by rotating the conveyance rollers 40 in the desired direction using a motor, not illustrated in the drawings.

A reject box 24 that stores banknotes determined to be unusable as banknotes for user pay-out (also referred to below as pay-out reject banknotes) is disposed in front of the front conveyance section 30*a*.

A front end of the front conveyance section 30*a* is connected to the reject box 24, and a front side upper end of the front conveyance section 30*a* is connected to the pay-in/pay-out port section 21. Moreover, a conveyance path switch 32*a* is provided at a front end portion of the front conveyance section 30*a* at a connection location between the pay-in/pay-out port section 21 and the reject box 24.

The front conveyance path 30*a*1 of the front conveyance section 30*a* has a length that enables the conveyance path switch 32*a* to be switched to the reject box 24 or the pay-in/pay-out port section 21 based on the classification results of banknote classification by the time that a banknote heading from rear to front during a pay-out transaction reaches the conveyance path switch 32*a* after passing through the classification section 22.

An upper end of the rear conveyance section 30*b* is connected to the temporary holding section 23, and a lower end of the rear conveyance section 30*b* is connected to a sorting conveyance section 27, described later. The rear conveyance section 30*b* is further provided with a conveyance path switch 32*b* at a central portion configuring a connection location between the temporary holding section 23 and the sorting conveyance section 27. In the following explanation, the conveyance path switches 32*a* and 32*b* are also collectively referred to as the conveyance path switches 32.

The two conveyance path switches 32*a* and 32*b* switch between connection and non-connection between the classification section 22, the pay-in/pay-out port section 21, the temporary holding section 23, the reject box 24, and the sorting conveyance section 27 under control of the controller 10, and thereby switch the banknote conveyance destination to the pay-in/pay-out port section 21, the temporary holding section 23, the reject box 24, or the sorting conveyance section 27.

A conveyance state detection sensor 33 (FIG. 3) is installed in the rear conveyance section 30*b* below the conveyance path switch 32*b*. The conveyance state detection sensor 33 detects the conveyance state of banknotes in the rear conveyance section 30*b*.

The front-rear direction length of the rear conveyance section 30*b* is formed shorter than that of the front conveyance section 30*a*. Accordingly, the automated teller machine 1 enables a reduction in the size of the banknote pay-in/pay-out device 4 in the front-rear direction. The rear conveyance section 30*b* is accordingly formed with a short front-rear direction length, and so the rear conveyance path 30*b*1 does not have a length that enables the conveyance path switch 32*b* to be switched to the temporary holding section 23 or the sorting conveyance section 27 based on the classification results by the time that a banknote heading from front to rear during a pay-in transaction reaches the conveyance path switch 32*b* after passing through the classification section 22.

Three banknote storage boxes 26 (26*a* to 26*c*) that store banknotes by denomination are installed in a row along the front-rear direction below the classification section 22, inside a safe 20 that is enclosed by thick steel plates.

The sorting conveyance section 27 is installed extending in the front-rear direction above the banknote storage boxes 26 inside the safe 20. Namely, the sorting conveyance section 27 is installed between the classification section 22 and the banknote storage boxes 26.

A withholding box 25 that stores banknotes left behind in the pay-in/pay-out port section 21 by a user is installed below the sorting conveyance section 27, in front of the banknote storage box 26*c*.

The sorting conveyance section 27 connects the rear conveyance section 30*b* to each of the banknote storage boxes 26 and the withholding box 25, and conveys banknotes in both directions between the rear conveyance section 30*b*, and the respective banknote storage boxes 26 and withholding box 25.

Namely, the sorting conveyance section 27 conveys banknotes for storage in the banknote storage boxes 26 from the rear conveyance section 30*b* to the banknote storage boxes 26, and conveys banknotes to be paid out from the banknote storage boxes 26 to a user from the banknote storage boxes 26 to the rear conveyance section 30*b*.

1-3. Sorting Conveyance Section Configuration

As illustrated in FIG. 3, the sorting conveyance section 27 includes a sorting conveyance path 28 extending in the front-rear direction so as to extend downward from a lower end of the rear conveyance section 30*b* and curve toward the front, up to the upper side of the withholding box 25.

The sorting conveyance section 27 includes plural conveyance rollers 50 disposed facing each other across the sorting conveyance path 28, a conveyance guide 51 provided along the sorting conveyance path 28, and conveyor belts 52 mounted to the conveyance rollers 50. The sorting conveyance section 27 conveys banknotes in both directions by rotating the conveyance rollers 50 in the desired direction using a motor, not illustrated in the drawings.

A rear end of the sorting conveyance section 27 is connected to a lower end of the rear conveyance section 30*b*, and a front end of the sorting conveyance section 27 is connected to an upper end of the withholding box 25. The sorting conveyance section 27 is connected to upper ends of the banknote storage boxes 26*a*, 26*b*, and 26*c* at three locations between the front end and the rear end, and is provided with conveyance path switches 53*a*, 53*b*, and 53*c* at the respective connection locations with the banknote storage boxes 26*a*, 26*b*, and 26*c*.

The three conveyance path switches 53 (53*a* to 53*c*) switch the banknote conveyance destination to one out of the rear conveyance section 30*b*, the respective banknote storage boxes 26, or the withholding box 25 by switching between connection and non-connection between the sorting conveyance section 27 and the rear conveyance section 30*b*, the banknote storage boxes 26, and the withholding box 25, under control of the controller 10.

Respective conveyance state detection sensors 54 (54*a* and 54*b*) are installed at a front end and a rear end of the sorting conveyance section 27. The conveyance state detection sensors 54 (54*a* and 54*b*) detect the conveyance state of banknotes inside the sorting conveyance section 27.

A drive motor, not illustrated in the drawings, an electromagnetic solenoid, and a mechanical position detection sensor are incorporated into each mechanical section configuring the banknote pay-in/pay-out device 4. The controller 10 drives the required drive motors and electromagnetic solenoids according to the banknote transaction, and the mechanical position detection sensors detect the state of the respective mechanical sections.

A banknote position detection sensor that detects the position of a banknote is also incorporated into each mechanical section. The controller 10 monitors the position and movement of banknotes according to the banknote transaction using the banknote position detection sensors incorporated into each mechanical section.

1-4. Pay-In Count Processing

Next, explanation follows regarding pay-in count processing operation in the banknote pay-in/pay-out device 4, with reference to FIG. 4 to FIG. 7.

When a user inserts a cash card or the like into the automated teller machine 1 and selects a pay-in transaction and inputs a PIN or the like using the operation and display section 6, the banknote pay-in/pay-out device 4 opens the pay-in/pay-out port shutter 5 to adopt a state in which banknotes can be inserted.

Figure 4:
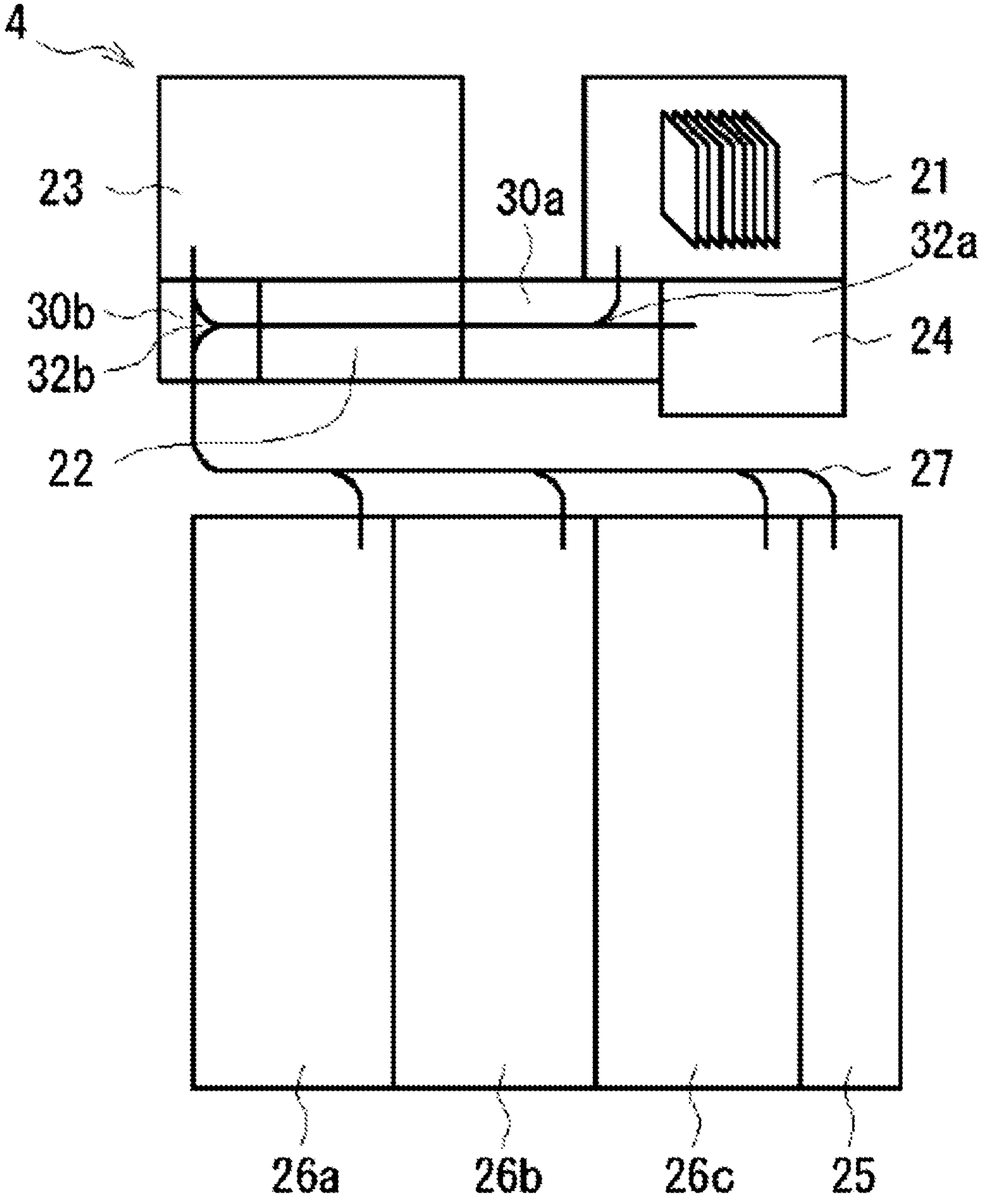
FIG. 4 is a schematic line drawing illustrating pay-in count processing (1) in the first exemplary embodiment.

Then, as illustrated in FIG. 4, when the user inserts banknotes into the pay-in/pay-out port section 21, a sensor inside the pay-in/pay-out port section 21 detects that banknotes have been inserted, and the banknote pay-in/pay-out device 4 closes the pay-in/pay-out port shutter 5 (FIG. 2).

Figure 5:
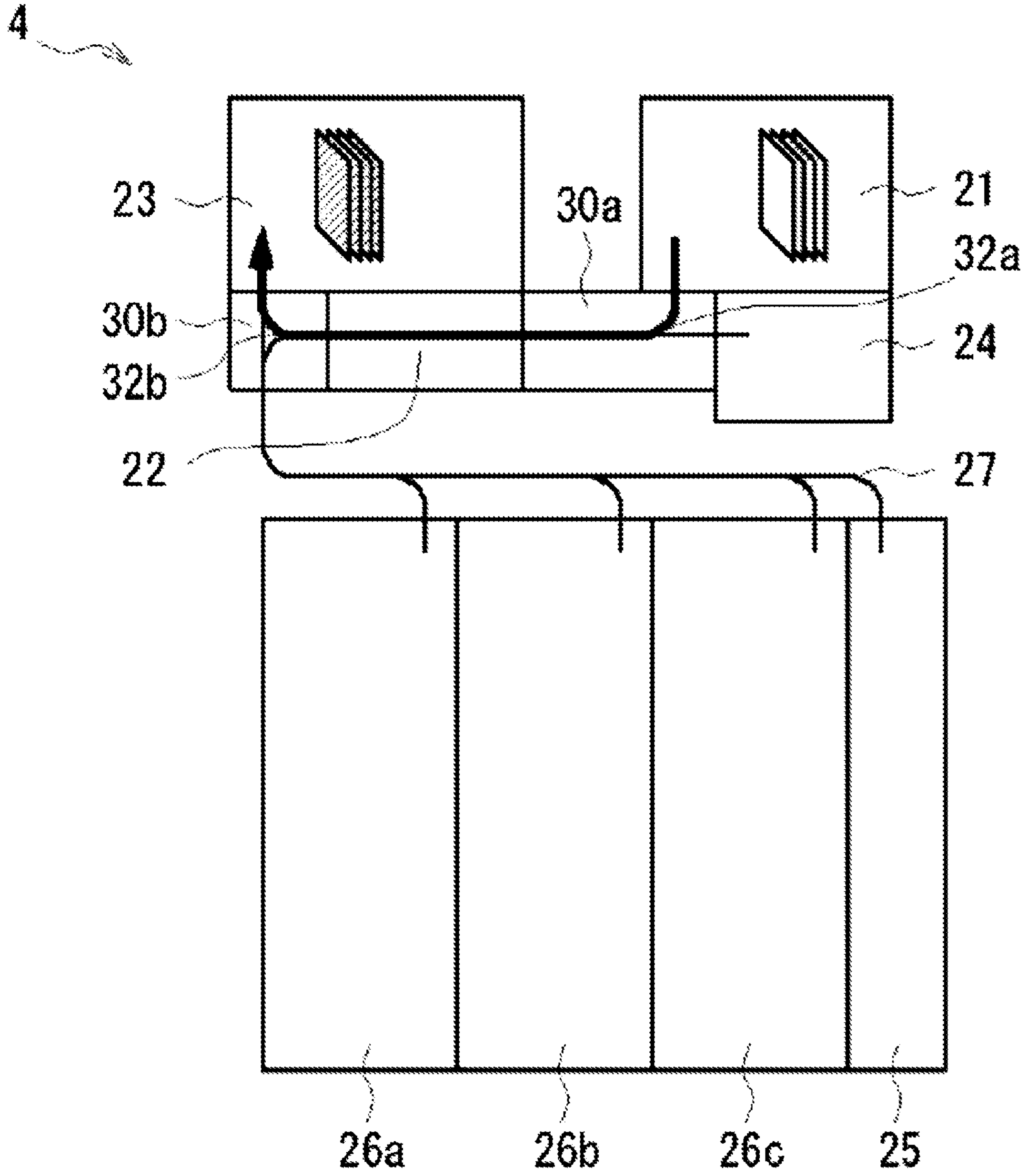
FIG. 5 is a schematic line drawing illustrating pay-in count processing (2) in the first exemplary embodiment.

As illustrated in FIG. 5, the banknotes inserted into the pay-in/pay-out port section 21 are then separated and fed out one note at a time to the downstream classification section 22 by the banknote pay-in/pay-out device 4.

The banknote pay-in/pay-out device 4 switches the conveyance path switch 32*b* such that the banknote conveyance destination is the temporary holding section 23, irrespective of the determination results of the classification section 22.

Namely, when has been determined to be a banknote acceptable as a pay-in banknote (namely a normal banknote) by the classification section 22, the banknote pay-in/pay-out device 4 conveys the normal banknote from the classification section 22 to the temporary holding section 23, where it is stored. When this is performed, the banknote pay-in/pay-out device 4 counts each banknote stored in the temporary holding section 23 by the denomination of the banknote classified by the classification section 22.

Figure 6:
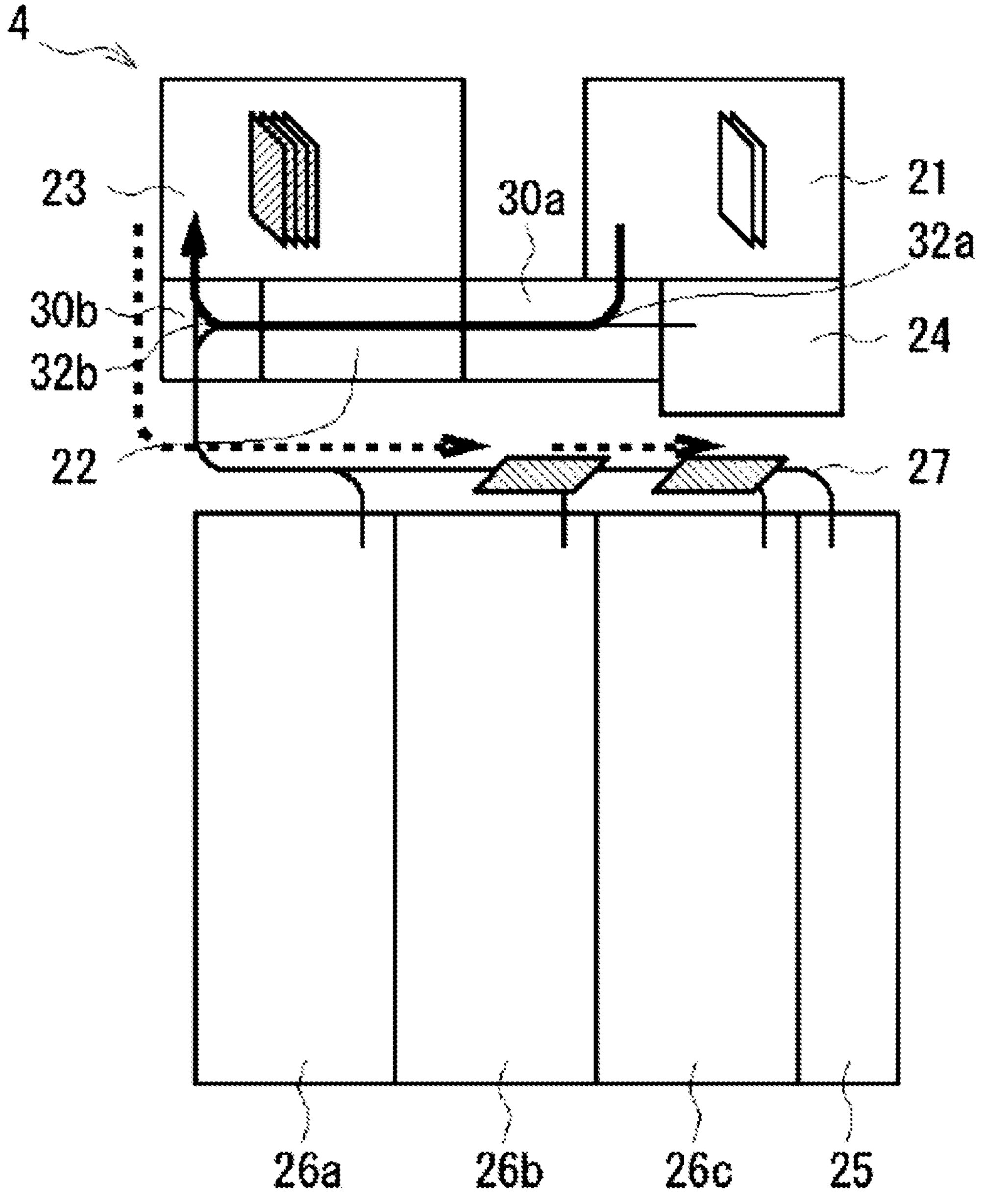
FIG. 6 is a schematic line drawing illustrating pay-in count processing (3) in the first exemplary embodiment.

However, when a banknote is determined by the classification section 22 to be unacceptable as a pay-in banknote (namely a pay-in reject banknote), as illustrated in FIG. 6, the banknote pay-in/pay-out device 4 conveys the pay-in reject banknote from the classification section 22 to the temporary holding section 23 where it is stored, and interrupts pay-in count processing, and also interrupts feeding out of the banknotes from the pay-in/pay-out port section 21.

The banknote pay-in/pay-out device 4 then switches the conveyance path switch 32*b* such that the conveyance destination of the pay-in reject banknote is the sorting conveyance section 27, and feeds out the pay-in reject banknote from the temporary holding section 23 and conveys the pay-in reject banknote to the sorting conveyance section 27 where it is temporarily retained.

As described above, in the rear conveyance section 30*b*, a banknote passing through the classification section 22 reaches the conveyance path switch 32*b* before the conveyance path switch 32*b* is switched to either the temporary holding section 23 or the sorting conveyance section 27. Accordingly, it is not possible to switch the banknote conveyance destination to the temporary holding section 23 or the sorting conveyance section 27 according to whether a banknote is a normal banknote or a pay-in reject banknote.

Accordingly, the banknote pay-in/pay-out device 4 switches the conveyance path switch 32*b* in advance, such that the banknote conveyance destination is the temporary holding section 23, regardless of whether a banknote is a normal banknote or a pay-in reject banknote, and initially stores a pay-in reject banknote in the temporary holding section 23 before interrupting pay-in count processing and conveying the pay-in reject banknote to the sorting conveyance section 27.

The banknote pay-in/pay-out device 4 then restarts pay-in count processing. When another pay-in reject banknote has been identified, the banknote pay-in/pay-out device 4 interrupts pay-in count processing again, and temporarily retains the pay-in reject banknote in the sorting conveyance section 27. The banknote pay-in/pay-out device 4 repeats this process until counting of the banknotes in the pay-in/pay-out port section 21 has been completed.

Figure 7:
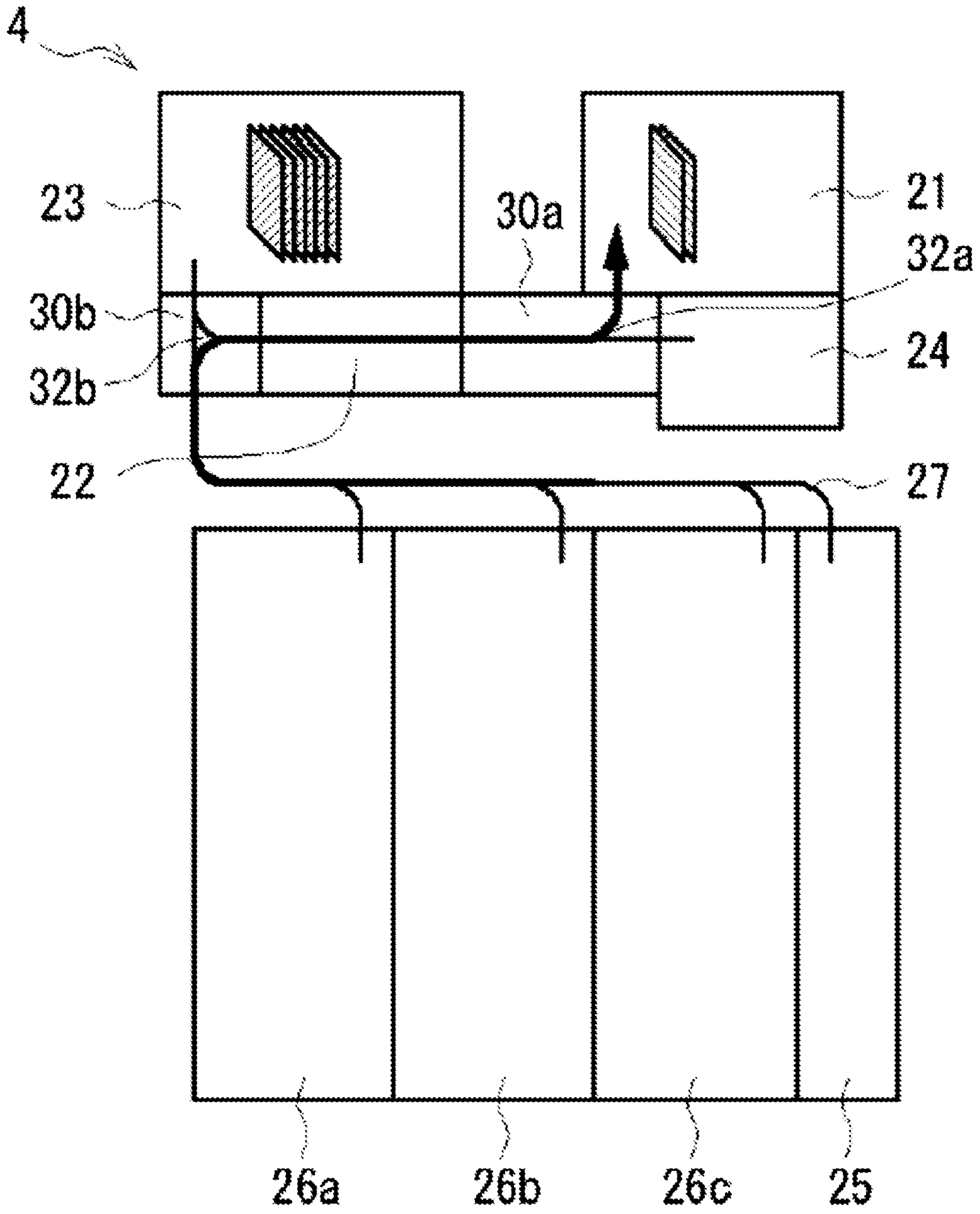
FIG. 7 is a schematic line drawing illustrating pay-in count processing (4) in the first exemplary embodiment.

Then, when counting of the banknotes in the pay-in/pay-out port section 21 has been completed, as illustrated in FIG. 7, the banknote pay-in/pay-out device 4 feeds out the pay-in reject banknotes that have been temporarily retained in the sorting conveyance section 27 to the classification section 22 one note at a time. The pay-in reject banknotes are replaced and collected in the pay-in/pay-out port section 21 via the classification section 22, and returned to the user.

When this is performed, the automated teller machine 1 displays guidance to take the pay-in reject banknotes on the operation and display section 6. The banknote pay-in/pay-out device 4 then opens the pay-in/pay-out port shutter 5 to adopt a state in which the pay-in reject banknotes can be taken.

Figure 8:
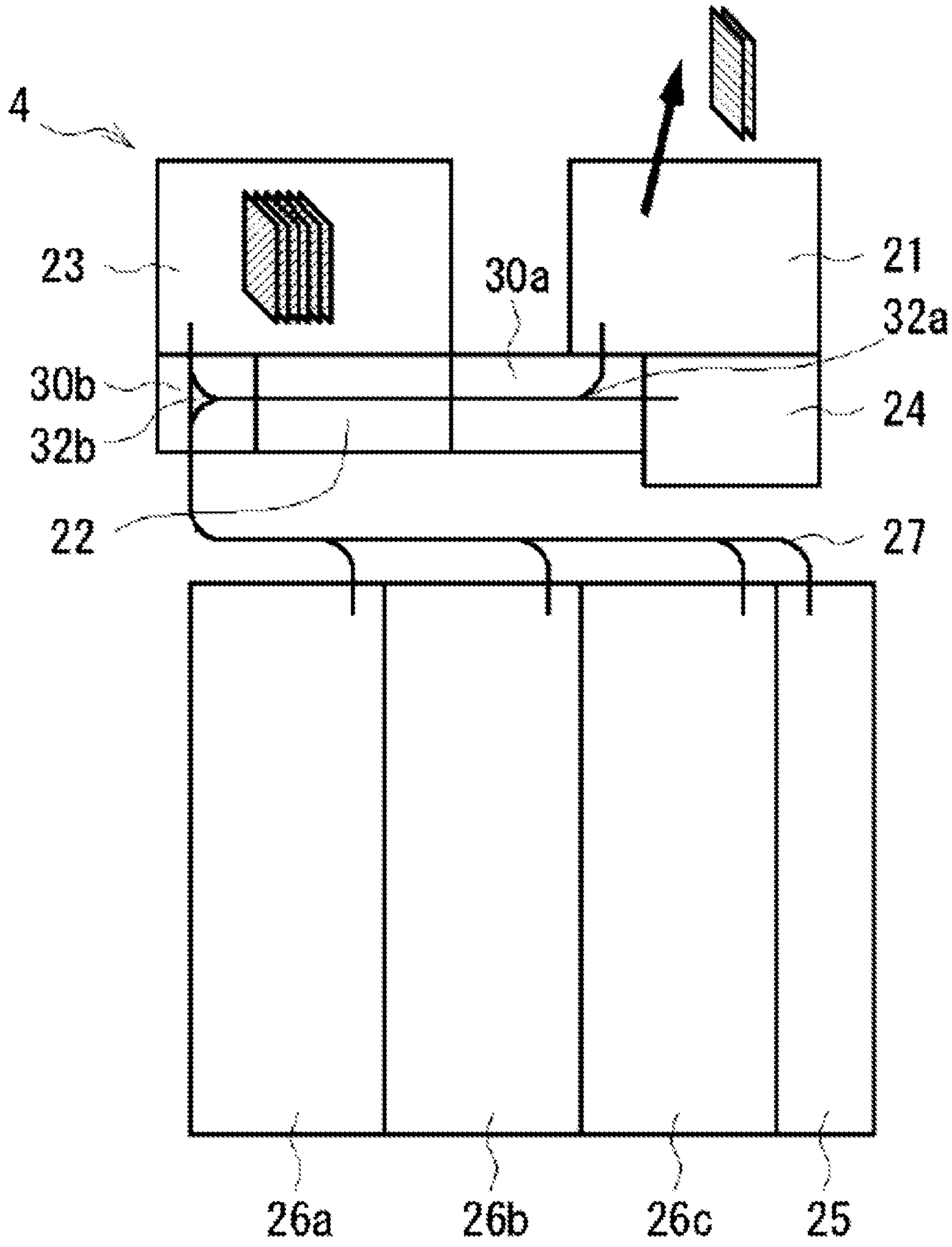
FIG. 8 is a schematic line drawing illustrating pay-in count processing (5) in the first exemplary embodiment.

Then, as illustrated in FIG. 8, when the user takes the pay-in reject banknotes out from the pay-in/pay-out port section 21, the sensor inside the pay-in/pay-out port section 21 detects that the banknotes have been taken, and the banknote pay-in/pay-out device 4 closes the pay-in/pay-out port shutter 5. The banknote pay-in/pay-out device 4 then reopens the pay-in/pay-out port shutter 5 to adopt a state in which banknotes can be inserted.

Note that when the user reinserts the banknotes into the pay-in/pay-out port section 21, the sensor inside the pay-in/pay-out port section 21 detects that banknotes have been inserted, and the banknote pay-in/pay-out device 4 closes the pay-in/pay-out port shutter 5. The banknote pay-in/pay-out device 4 repeats the above routine to count the inserted banknotes.

When the pay-in count processing has been completed, the automated teller machine 1 displays pay-in count results on the operation and display section 6, and confirms the pay-in count results with the user.

Note that when the user confirms the pay-in transaction by inputting an instruction to the operation and display section 6, the banknote pay-in/pay-out device 4 performs storage processing, described later.

1-5. Pay-In Count Processing when Maximum Number of Retained Pay-In Reject Banknotes has been Reached Explanation follows regarding operation when the pay-in reject banknotes temporarily retained in the sorting conveyance section 27 have reached a maximum number of retained notes, this being the maximum number of pay-in reject banknotes that can be temporarily retained, with reference to FIG. 9 to FIG. 12.

Figure 9:
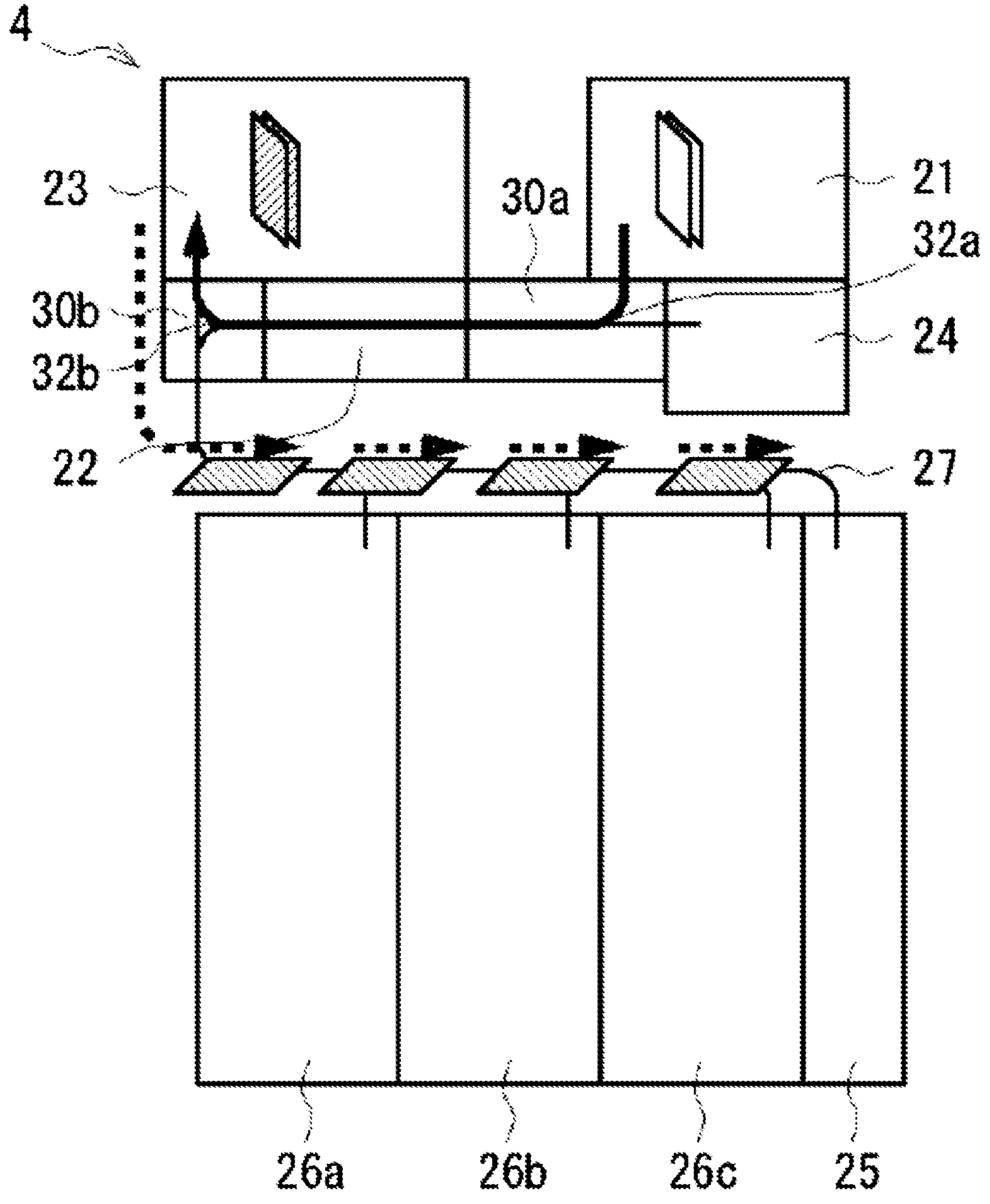
FIG. 9 is a schematic line drawing illustrating pay-in count processing (1) in the first exemplary embodiment in a case in which a maximum number of retained pay-in reject banknotes has been reached.

As illustrated in FIG. 9, the banknote pay-in/pay-out device 4 interrupts pay-in count processing when the number of temporarily retained pay-in reject banknotes has reached four notes, this being the maximum number of retained notes.

Figure 10:
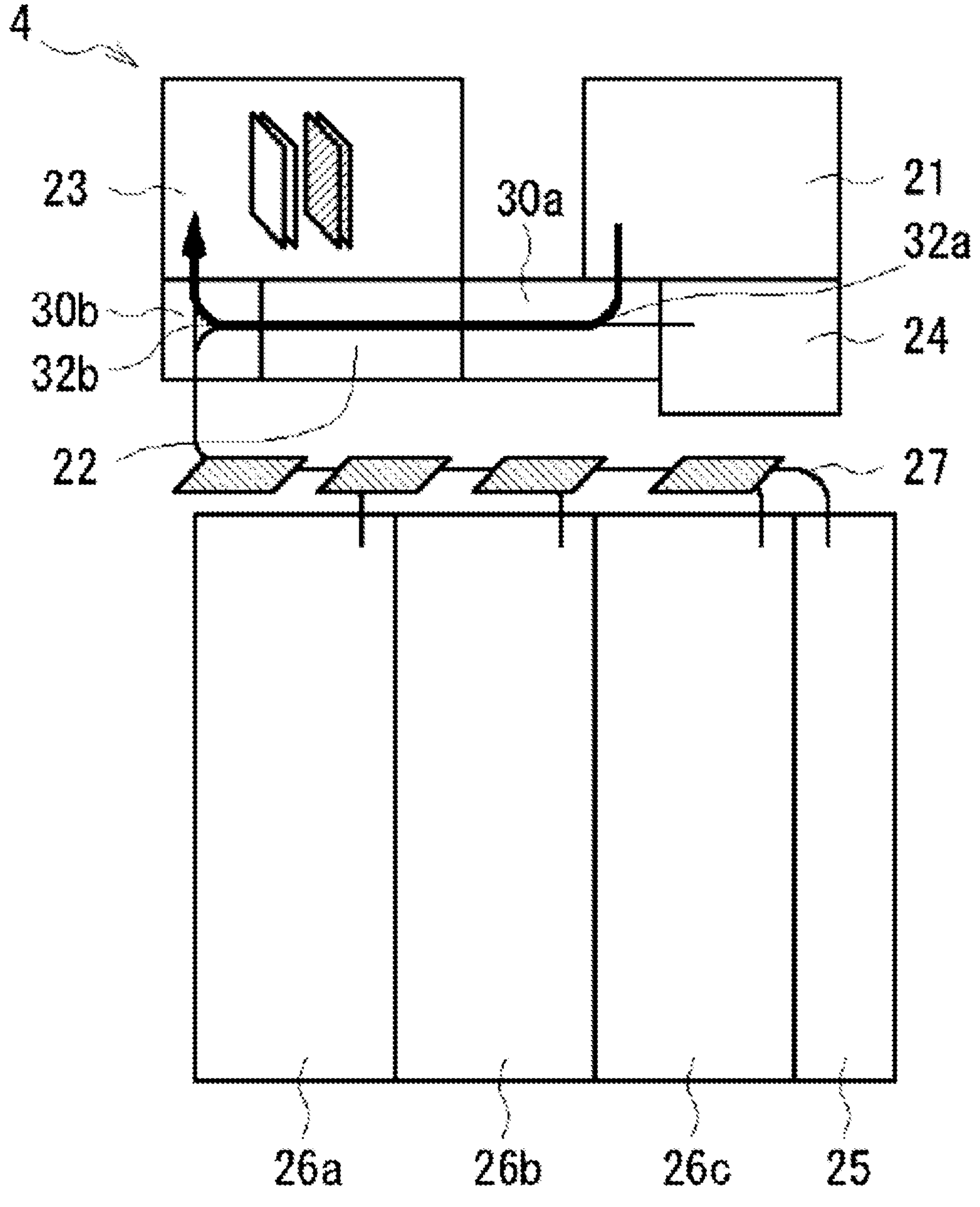
FIG. 10 is a schematic line drawing illustrating pay-in count processing (2) in the first exemplary embodiment in a case in which a maximum number of retained pay-in reject banknotes has been reached.

Then, as illustrated in FIG. 10, one note at a time, the banknote pay-in/pay-out device 4 conveys all of the banknotes remaining in the pay-in/pay-out port section 21 via the classification section 22 to the temporary holding section 23, where they are stored.

Figure 11:
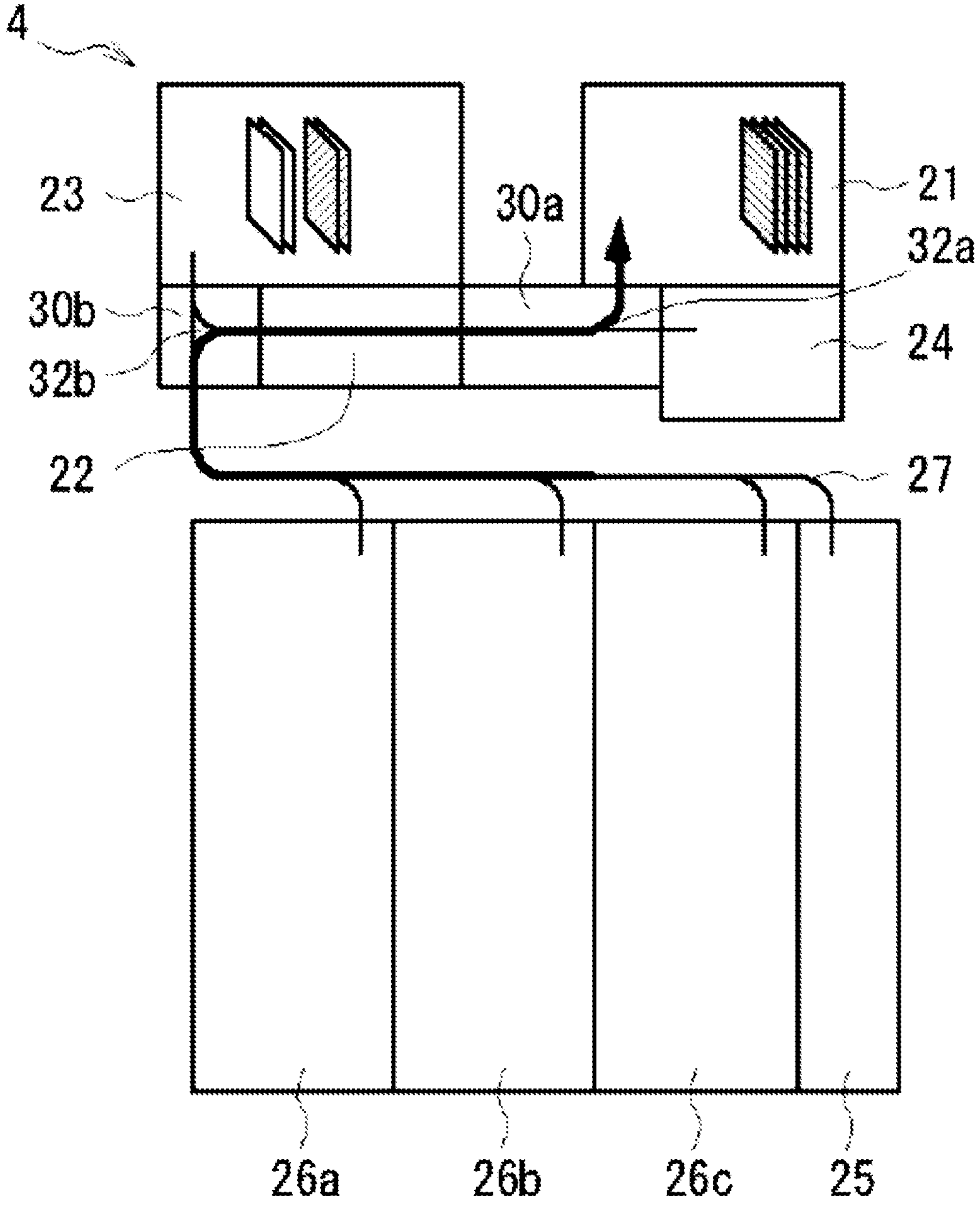
FIG. 11 is a schematic line drawing illustrating pay-in count processing (3) in the first exemplary embodiment in a case in which a maximum number of retained pay-in reject banknotes has been reached.

Next, as illustrated in FIG. 11, one note at a time, the banknote pay-in/pay-out device 4 conveys the pay-in reject banknotes temporarily retained in the sorting conveyance section 27 to the pay-in/pay-out port section 21, where they are collected, via the classification section 22.

Figure 12:
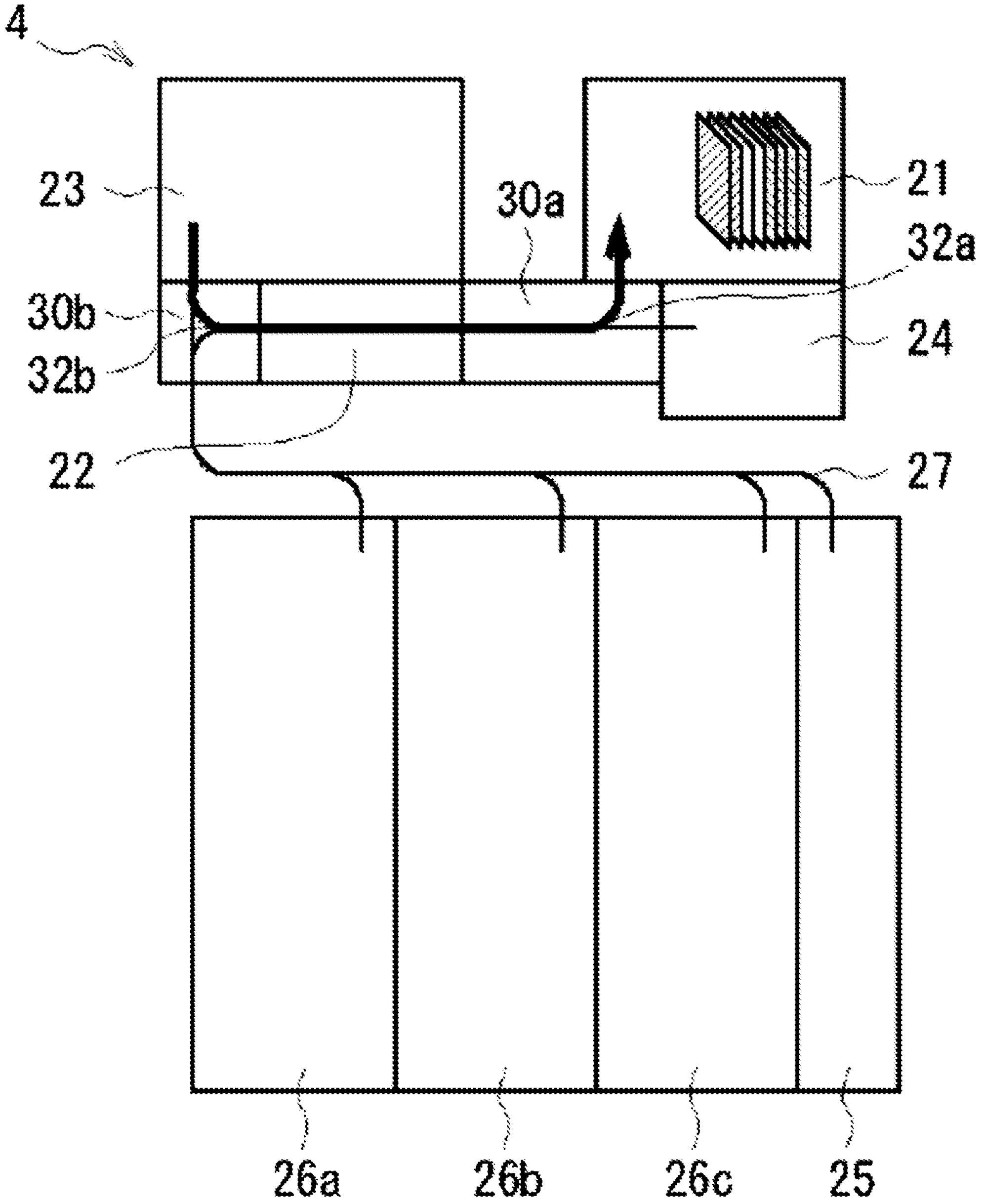
FIG. 12 is a schematic line drawing illustrating pay-in count processing (4) in the first exemplary embodiment in a case in which a maximum number of retained pay-in reject banknotes has been reached.

As illustrated in FIG. 12, one note at a time, the banknote pay-in/pay-out device 4 then conveys all the banknotes in the temporary holding section 23 through the classification section 22, replaces the banknotes in the pay-in/pay-out port section 21 where they are collected, and then restarts the pay-in count processing.

Accordingly, in the banknote pay-in/pay-out device 4, when the banknotes are fed out from the pay-in/pay-out port section 21 again, the pay-in reject banknotes that were being retained in the sorting conveyance section 27 are disposed at the rear side in order of conveyance, and the normal banknotes that were being held in the temporary holding section 23 and the banknotes that remained in the pay-in/pay-out port section 21 are disposed at the front side in order of conveyance, such that when pay-in count processing is restarted, the pay-in reject banknotes can be prevented from being fed out from the pay-in/pay-out port section 21 ahead of the other banknotes.

Repeating the pay-in count processing enables the banknote pay-in/pay-out device 4 to return to the user only the pay-in reject banknotes, from which the normal banknotes and the uncounted banknotes have been removed. This thereby enables a reduction in the number of banknotes that are returned to the user.

1-6. Pay-In Reject Banknote Withholding Processing

Figure 13:
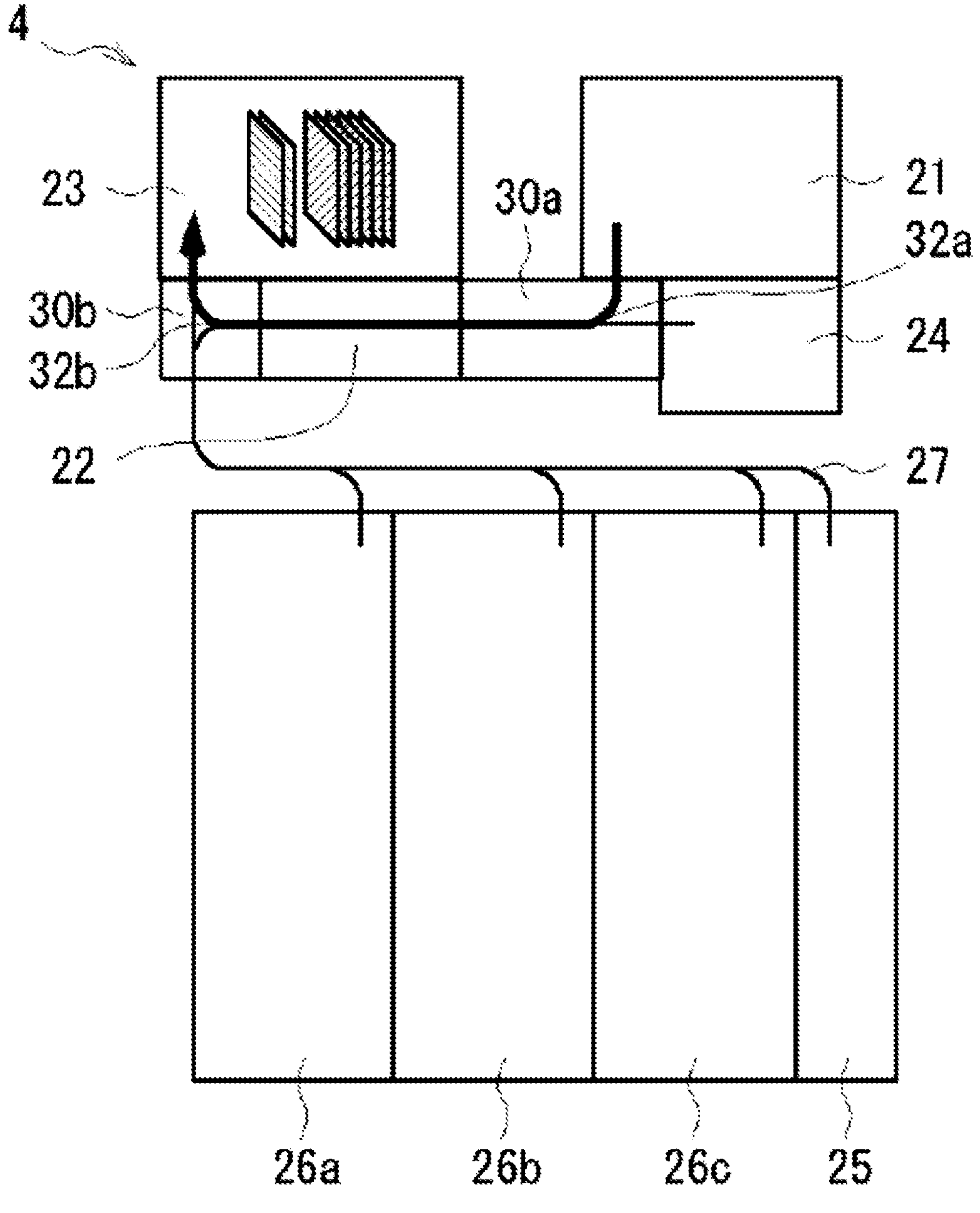
FIG. 13 is a schematic line drawing illustrating pay-in reject banknote withholding processing (1).
Figure 14:
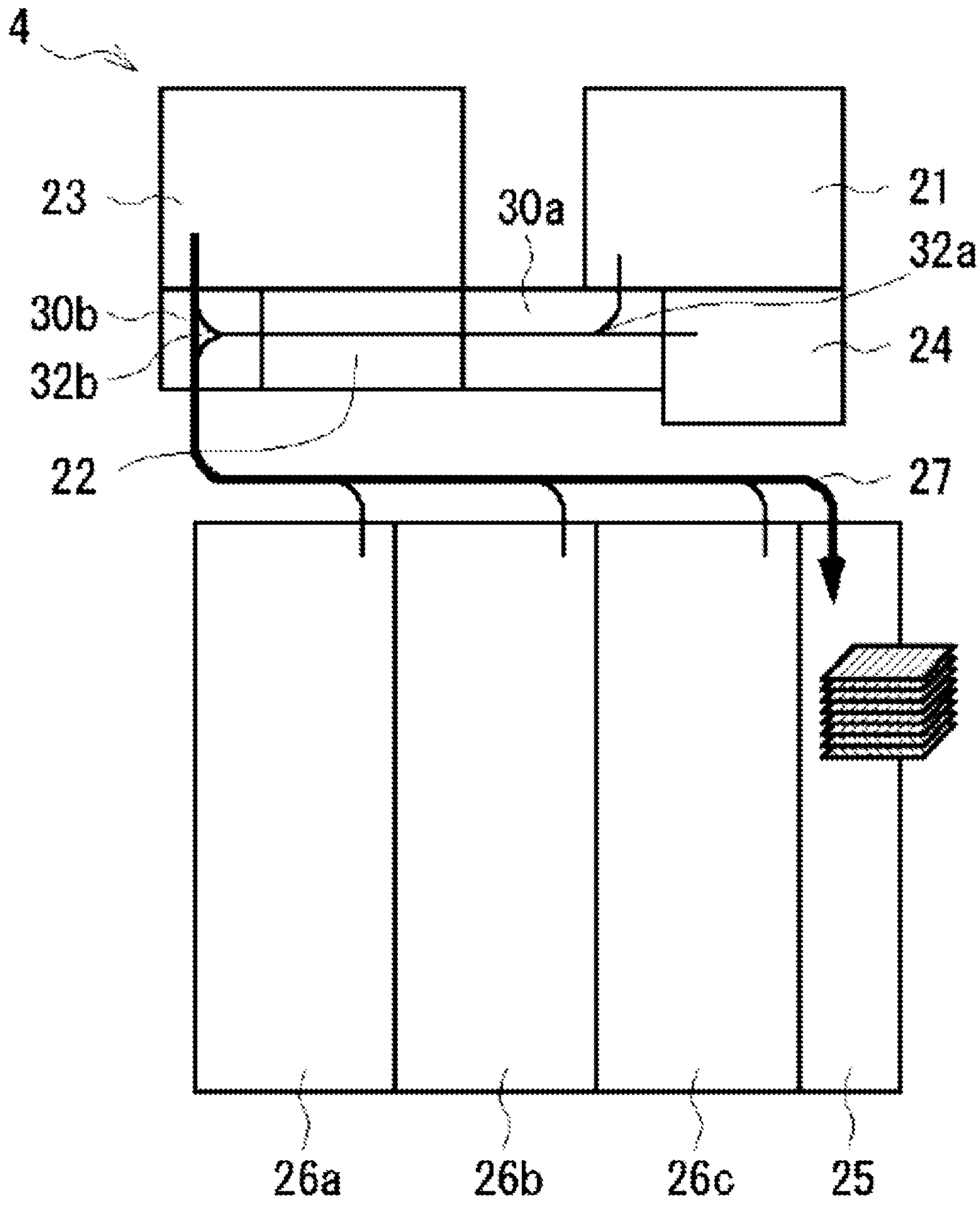
FIG. 14 is a schematic line drawing illustrating pay-in reject banknote withholding processing (2).

Next, explanation follows regarding operation in pay-in reject banknote withholding processing in the banknote pay-in/pay-out device 4, with reference to FIG. 13 and FIG. 14. Pay-in reject banknote withholding processing is processing performed in cases in which the user forgets to take the pay-in reject banknotes after they have been replaced in the pay-in/pay-out port section 21 during the pay-in count processing described above.

Firstly, after the pay-in reject banknotes have been replaced in the pay-in/pay-out port section 21, the banknote pay-in/pay-out device 4 closes the pay-in/pay-out port shutter 5 if the pay-in reject banknotes have not been taken out of the pay-in/pay-out port section 21 within a specific period of time.

Then, as illustrated in FIG. 13, one note at a time, the banknote pay-in/pay-out device 4 separates the pay-in reject banknotes collected in the pay-in/pay-out port section 21 and conveys them through the classification section 22 to the temporary holding section 23, where they are stored together with the banknotes already collected in the temporary holding section 23.

As illustrated in FIG. 14, one note at a time, the banknote pay-in/pay-out device 4 then feeds out the banknotes stored in the temporary holding section 23 and conveys them to the withholding box 25, where they are collected.

1-7. Storage Processing

Figure 15:
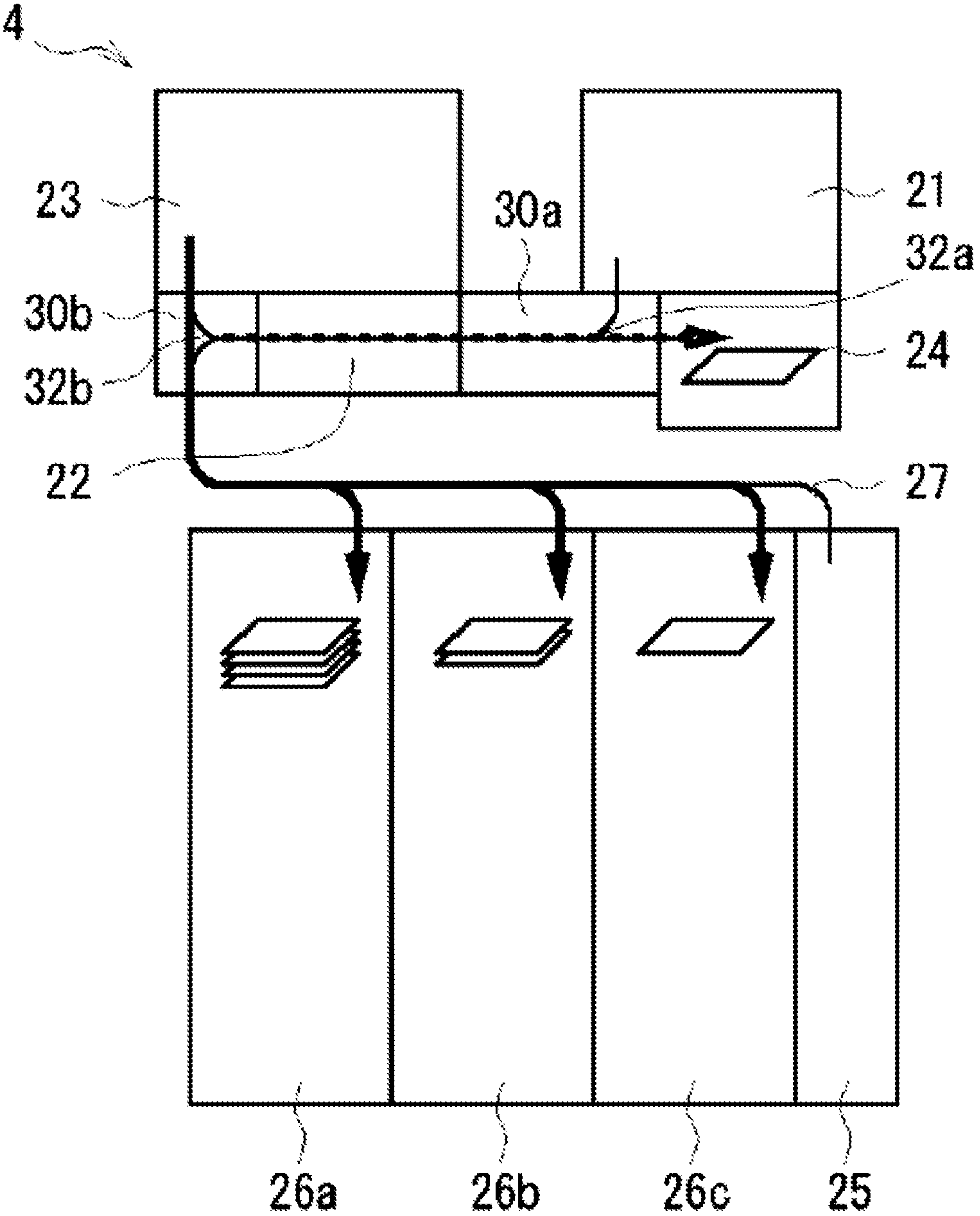
FIG. 15 is a schematic line drawing illustrating storage processing in the first exemplary embodiment.

Next, explanation follows regarding operation during storage processing by the banknote pay-in/pay-out device 4, with reference to FIG. 15. Storage processing is processing performed after the user has input an instruction to confirm a pay-in transaction.

One note at a time, the banknote pay-in/pay-out device 4 separates and feeds out the banknotes that were stored in the temporary holding section 23 during the pay-in count processing described above.

Since the classification section 22 determines the physical condition, denomination, conveyance state and the like of the banknotes one note at a time during the pay-in count processing, the banknote pay-in/pay-out device 4 switches the conveyance path switch 32*b* according to the determination results, without conveying the banknotes to the classification section 22 again.

Namely, in cases in which the classification section 22 has determined a banknote to be a banknote unsuitable for storage (namely a storage reject banknote) in the pay-in count processing, the banknote pay-in/pay-out device 4 switches the conveyance path switches 32*a* and 32*b* such that the banknote conveyance destination is the reject box 24. The banknote pay-in/pay-out device 4 thereby conveys the storage reject banknote from the temporary holding section 23 to the reject box 24 where it is collected.

In cases in which the classification section 22 has determined a banknote to be a storable banknote (namely a normal banknote) in the pay-in count processing, the banknote pay-in/pay-out device 4 switches the conveyance path switch 32*b* such that the banknote conveyance destination is the sorting conveyance section 27. The banknote pay-in/pay-out device 4 thereby conveys the normal banknote from the temporary holding section 23 to the sorting conveyance section 27.

The banknote pay-in/pay-out device 4 switches the conveyance path switches 53 (53*a* to 53*c*) such that the storage destinations of the banknotes are the banknote storage boxes 26 (26*a* to 26*c*), according to the banknote denomination. The banknote pay-in/pay-out device 4 thereby conveys banknotes from the sorting conveyance section 27 to the banknote storage boxes 26, where they are collected according to denomination.

As described above, the temporary holding section 23 is what is known as a tape winding type, and therefore does not change the sequence of the banknotes taken in from the outside, such that the last banknote to enter is the first banknote to be fed out, without overlapping conveyance. Accordingly, in storage processing, the banknote pay-in/pay-out device 4 enables the banknotes temporarily held in the temporary holding section 23 to be conveyed to the correct banknote storage boxes 26 by denomination, using the classification results of classification made prior to holding the banknotes in the temporary holding section 23, without conveying the banknotes to the classification section 22 again.

1-8. Pay-Out Transaction Processing

Figure 16:
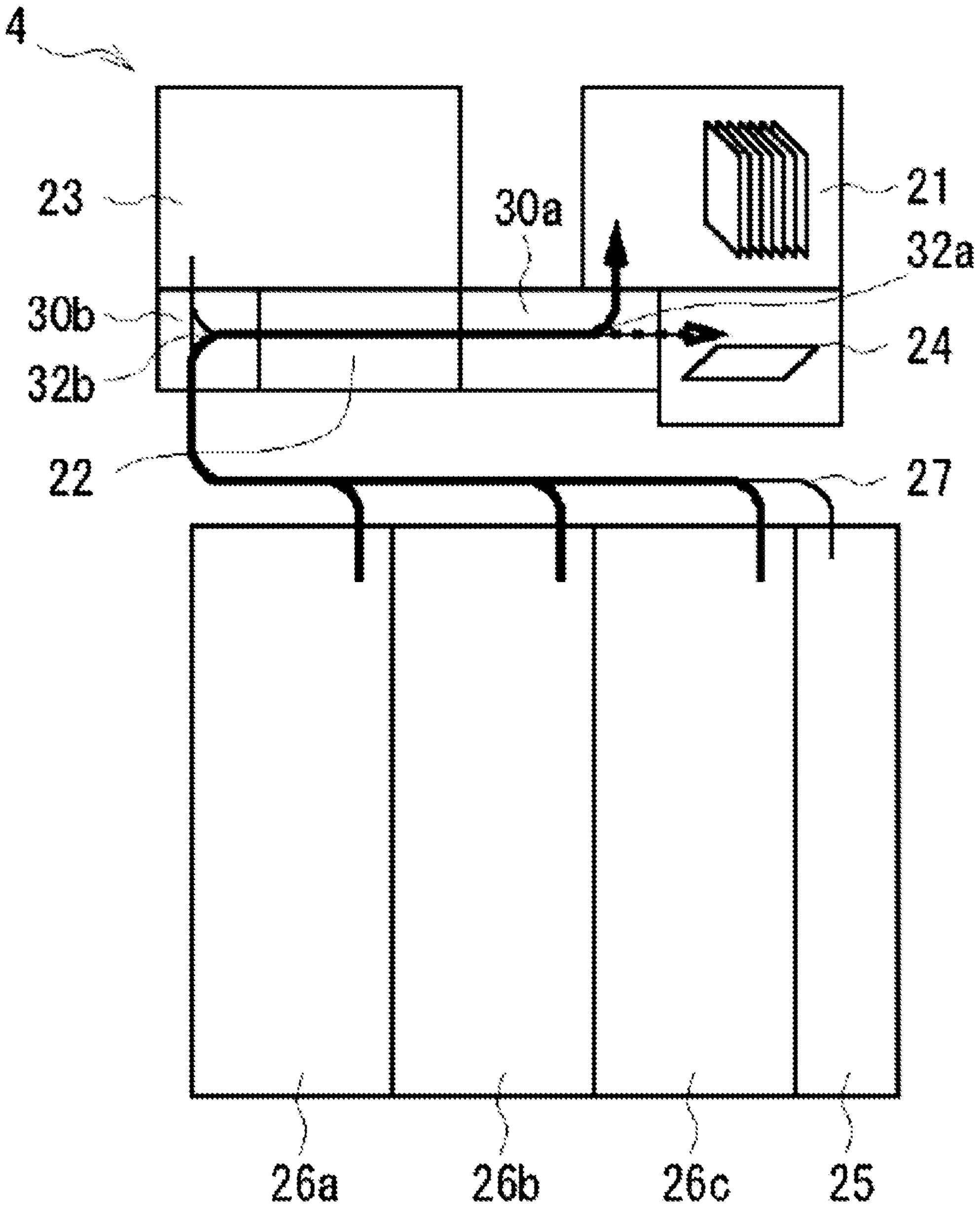
FIG. 16 is a schematic line drawing illustrating pay-out transaction processing.

Next, explanation follows regarding operation during pay-out transaction processing by the banknote pay-in/pay-out device 4, with reference to FIG. 16.

In the banknote pay-in/pay-out device 4, when a user inserts a cash card or the like into the automated teller machine 1, selects a pay-out transaction, and inputs a PIN, withdrawal amount, and the like using the operation and display section 6, the number of banknotes of each denomination required to make up the requested amount is identified, and banknotes are fed out from the banknote storage boxes 26 (26*a* to 26*c*) to the sorting conveyance section 27 one note at a time according to the number of banknotes of each denomination, and are conveyed to the classification section 22.

When a banknote has been determined to be a banknote that cannot be paid out (namely a pay-out reject banknote) by the classification section 22, the banknote pay-in/pay-out device 4 switches the conveyance path switch 32*a* such that the conveyance destination of the pay-out reject banknote is the reject box 24, and the pay-out reject banknote is conveyed from the classification section 22 to the reject box 24, where it is collected.

When a banknote has been determined to be a banknote that can be paid out (namely a normal banknote) by the classification section 22, the banknote pay-in/pay-out device 4 switches the conveyance path switch 32*a* such that the conveyance destination of the normal banknote is the pay-in/pay-out port section 21, and the normal banknote is conveyed from the classification section 22 to the pay-in/pay-out port section 21, where it is collected.

As described above, in the front conveyance section 30*a*, the front conveyance path 30*a*1 has a length that enables the conveyance path switch 32*a* to be switched to the reject box 24 or the pay-in/pay-out port section 21 based on the classification results by the time that a banknote heading from rear to front during a pay-out transaction reaches the conveyance path switch 32*a* after passing through the classification section 22. Accordingly, the banknote pay-in/pay-out device 4 switches the banknote conveyance destination to the pay-in/pay-out port section 21 or the reject box 24 based on the classification results of the classification section 22.

When conveyance of the banknotes making up the withdrawal amount has been completed, the banknote pay-in/pay-out device 4 opens the pay-in/pay-out port shutter 5 to adopt a state in which the banknotes collected inside the pay-in/pay-out port section 21 can be taken.

Then, when the banknotes have been taken out of the pay-in/pay-out port section 21 by the user, the sensor inside the pay-in/pay-out port section 21 detects that the banknotes have been taken, and the banknote pay-in/pay-out device 4 closes the pay-in/pay-out port shutter 5.

1-9. Pay-Out Banknote Withholding Processing

Figure 17:
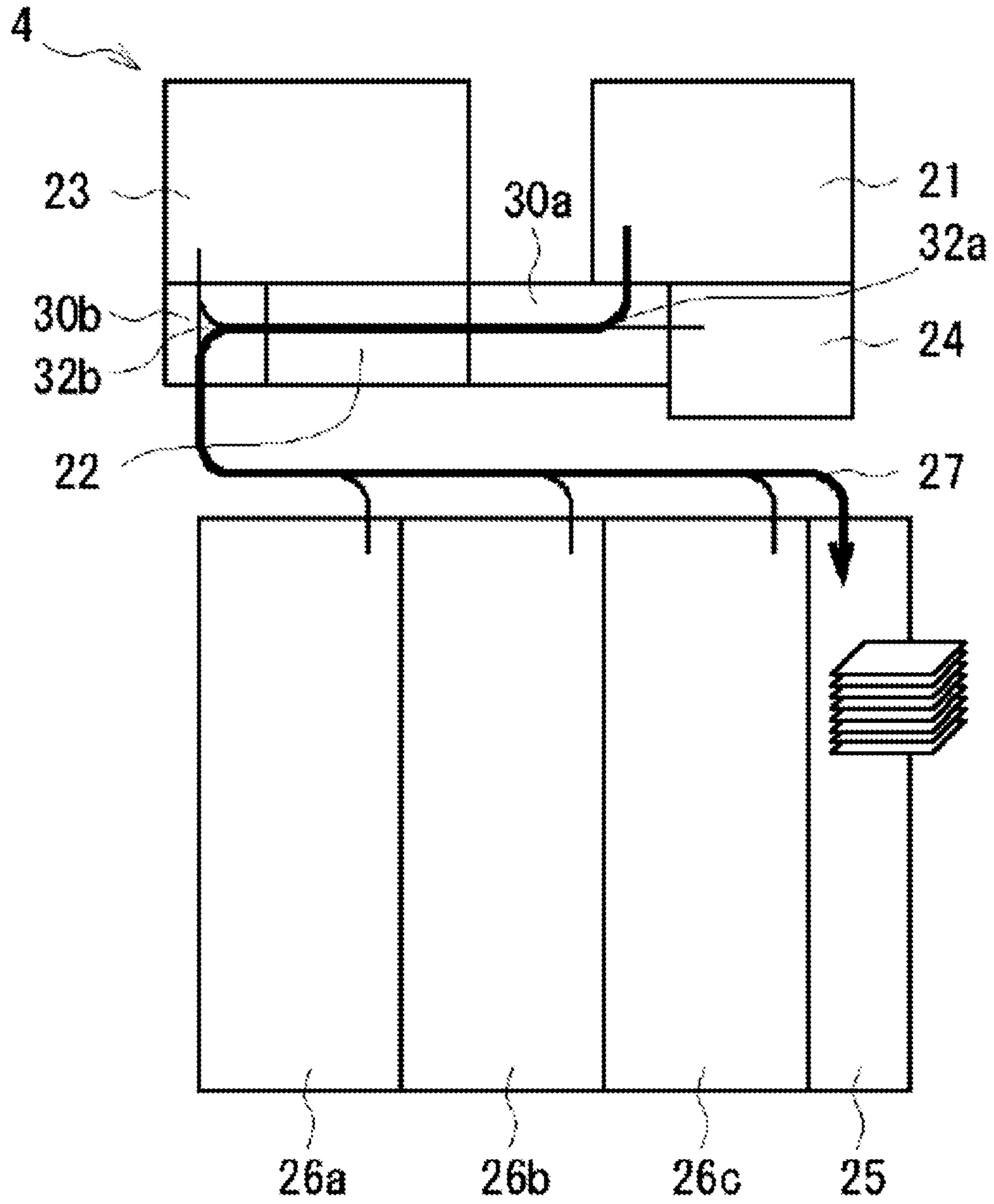
FIG. 17 is a schematic line drawing illustrating pay-out banknote withholding processing.

Next, explanation follows regarding pay-out banknote withholding processing operation by the banknote pay-in/pay-out device 4, with reference to FIG. 17. Pay-out banknote withholding processing is processing performed in cases in which the user forgets to take the banknotes after they have been collected in the pay-in/pay-out port section 21 during the pay-out transaction processing described above.

Firstly, after the banknotes have been collected in the pay-in/pay-out port section 21, the banknote pay-in/pay-out device 4 closes the pay-in/pay-out port shutter 5 if the banknotes have not been taken out of the pay-in/pay-out port section 21 within a specific period of time.

Then, one note at a time, the banknote pay-in/pay-out device 4 separates and feeds out the banknotes (namely forgotten banknotes) collected in the pay-in/pay-out port section 21 to the classification section 22.

The banknote pay-in/pay-out device 4 switches the conveyance path switches 32*b* and 53 (53*a* to 53*c*) such that the banknote conveyance destination is the withholding box 25, irrespective of the determination results of the classification section 22.

The banknote pay-in/pay-out device 4 conveys the banknotes from the classification section 22 to the withholding box 25, where they are collected.

1-10. Temporary Retention of Pay-In Reject Banknotes

Operation when temporarily retaining pay-in reject banknotes in the sorting conveyance section 27 during the banknote pay-in count processing described above will now be explained with reference to FIG. 18 to FIG. 22.

Firstly, out of the banknotes inserted into the pay-in/pay-out port section 21, a first pay-in reject banknote BL1 to have been determined to be unacceptable for pay-in by the classification section 22 is fed out from the temporary holding section 23 and moved downward inside the rear conveyance section 30*b* by the banknote pay-in/pay-out device 4.

At this point, the banknote pay-in/pay-out device 4 has already switched the conveyance path switch 32*b* such that the conveyance destination of the first pay-in reject banknote BL1 is the sorting conveyance section 27.

Figure 18:
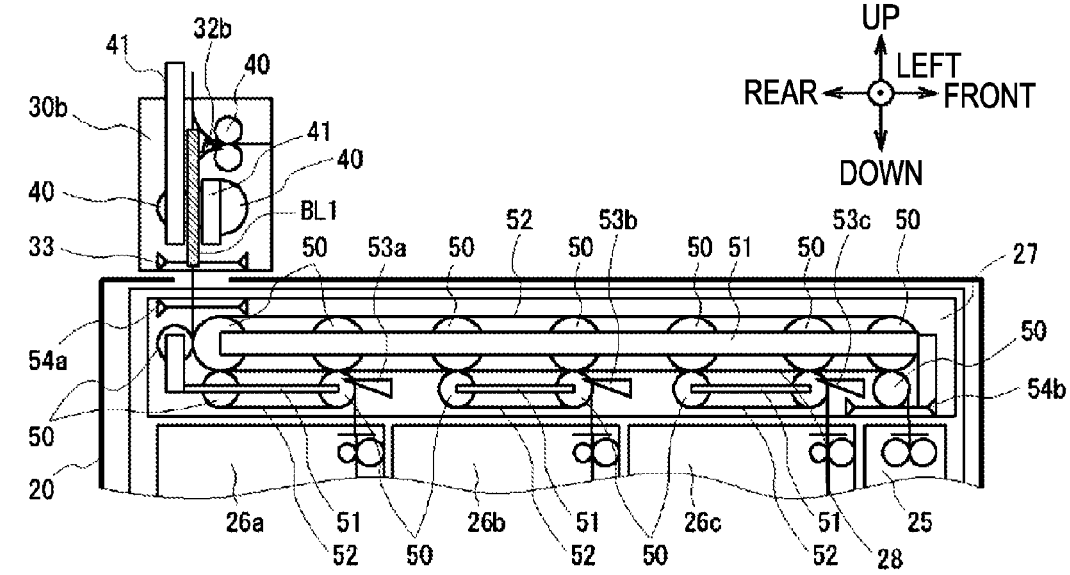
FIG. 18 is a left side view illustrating temporary retention of pay-in reject banknotes in the first exemplary embodiment (1).

Then, as illustrated in FIG. 18, when a conveyance direction leading edge of the first pay-in reject banknote BL1 reaches the conveyance state detection sensor 33, the banknote pay-in/pay-out device 4 detects this using the conveyance state detection sensor 33.

When this is performed, the banknote pay-in/pay-out device 4 actuates the motors, not illustrated in the drawings, and rotates the conveyance rollers 50 such that the conveyance direction inside the sorting conveyance section 27 switches from a direction toward the rear to a direction toward the front (namely a retention direction).

When this is performed, the banknote pay-in/pay-out device 4 has already switched the conveyance path switches 53 (53*a* to 53*c*) such that the sorting conveyance section 27 and the banknote storage boxes 26 (26*a* to 26*c*) are not connected to each other.

Namely, the conveyance path switches 53 are switched such that the banknote moves forward along the sorting conveyance section 27 without entering any of the banknote storage boxes 26.

Then, the pay-in reject banknote BL1 that has passed the conveyance state detection sensor 33 is conveyed from the rear conveyance section 30*b* to the sorting conveyance section 27, and moves forward along the sorting conveyance section 27.

When a conveyance direction rear edge of the first pay-in reject banknote BL1 reaches the conveyance state detection sensor 54*a*, the banknote pay-in/pay-out device 4 detects this using the conveyance state detection sensor 54*a*.

Figure 19:
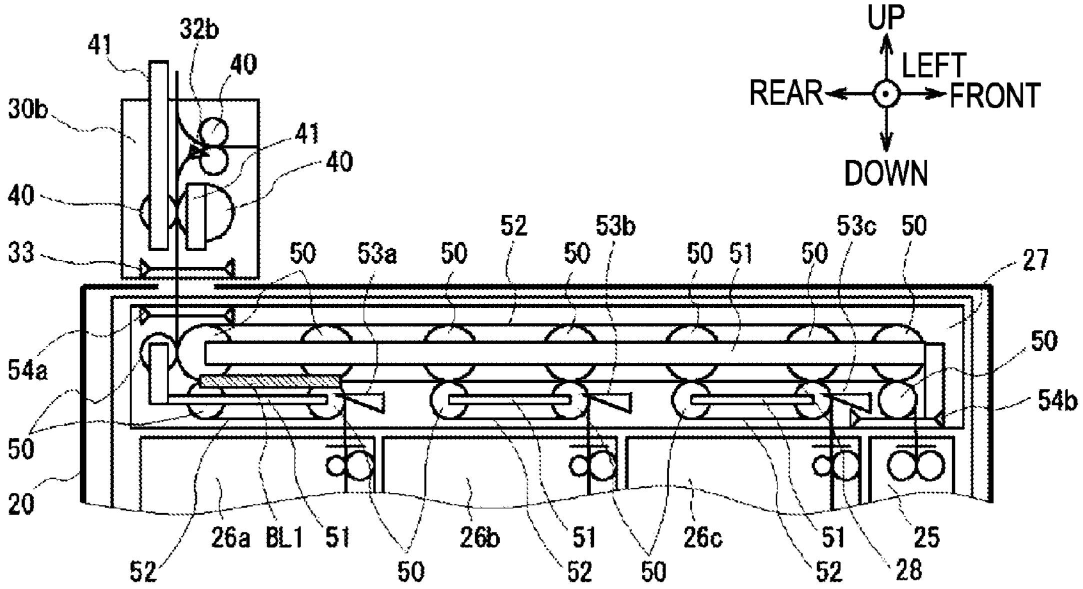
FIG. 19 is a left side view illustrating temporary retention of pay-in reject banknotes in the first exemplary embodiment (2).

When this occurs, the banknote pay-in/pay-out device 4 stops the motors, not illustrated in the drawings, stopping the rotation of the conveyance rollers 50, and thereby stopping the pay-in reject banknote at the rear end of the sorting conveyance section 27. Accordingly, as illustrated in FIG. 19, the first pay-in reject banknote BL1 is temporarily retained in the sorting conveyance section 27.

Figure 20:
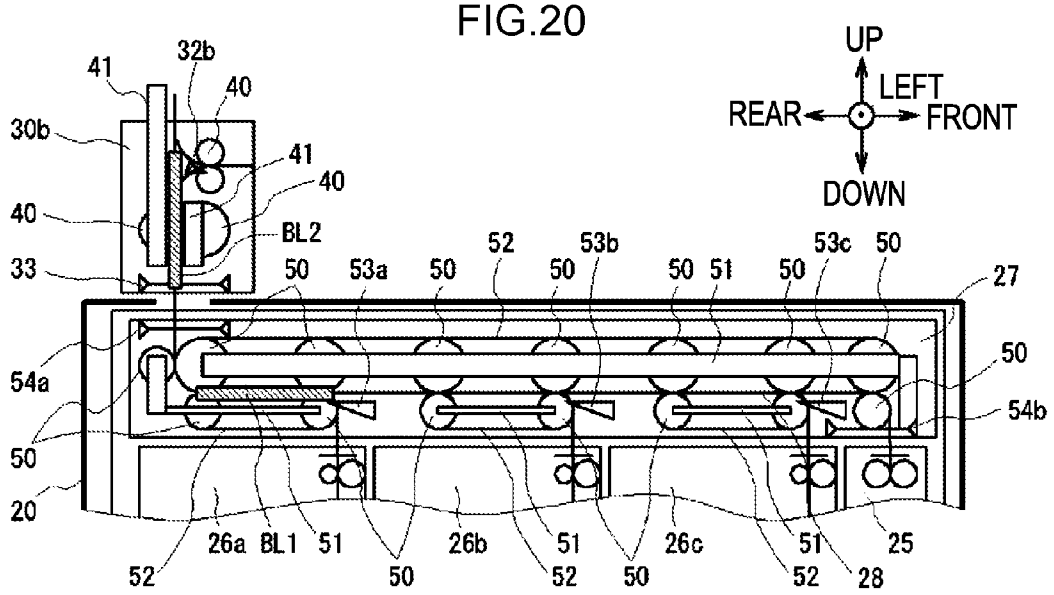
FIG. 20 is a left side view illustrating temporary retention of pay-in reject banknotes in the first exemplary embodiment (3).

Then, as illustrated in FIG. 20, when the conveyance direction leading edge of a second pay-in reject banknote BL2 reaches the conveyance state detection sensor 33, the banknote pay-in/pay-out device 4 detects this using the conveyance state detection sensor 33.

When this is performed, the banknote pay-in/pay-out device 4 actuates the motors, not illustrated in the drawings, again, and rotates the conveyance rollers 50 such that the conveyance direction of the sorting conveyance section 27 is the retention direction.

The first pay-in reject banknote BL1 temporarily retained in the sorting conveyance section 27 moves forward accordingly.

Namely, the sorting conveyance section 27 moves the first pay-in reject banknote BL1 forward before the second pay-in reject banknote BL2 is conveyed in, such that the second pay-in reject banknote BL2 to be conveyed in does not overlap with the first pay-in reject banknote BL1.

Then, the second pay-in reject banknote BL2 that has passed the conveyance state detection sensor 33 is conveyed from the rear conveyance section 30*b* to the sorting conveyance section 27, and moves forward along the sorting conveyance section 27.

Note that the first pay-in reject banknote BL1 is moved forward before the second pay-in reject banknote BL2 is conveyed into the sorting conveyance section 27, such that the first pay-in reject banknote BL1 and the second pay-in reject banknote BL2 move forward in a state with a specific spacing between them.

Figure 21:
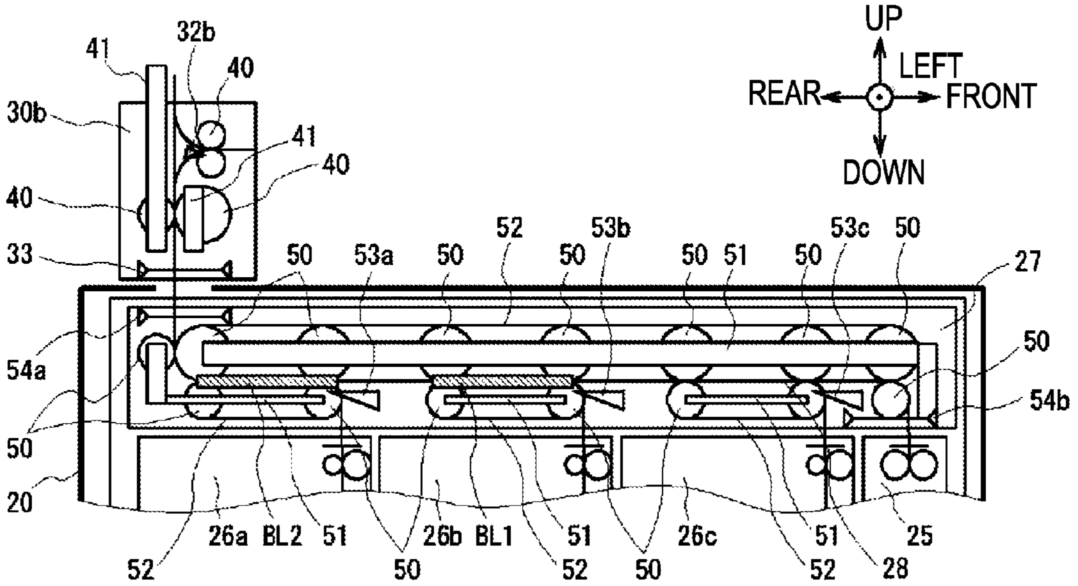
FIG. 21 is a left side view illustrating temporary retention of pay-in reject banknotes in the first exemplary embodiment (4).

When the conveyance direction rear edge of the second pay-in reject banknote BL2 reaches the conveyance state detection sensor 54*a*, the banknote pay-in/pay-out device 4 detects this using the conveyance state detection sensor 54*a*, and the banknote pay-in/pay-out device 4 stops the motors, not illustrated in the drawings, stopping the rotation of the conveyance rollers 50 of the sorting conveyance section 27. The second pay-in reject banknote BL2 is accordingly stopped at the rear end of the sorting conveyance section 27, as illustrated in FIG. 21.

When this is performed, the first pay-in reject banknote BL1 is stopped in front of the second pay-in reject banknote BL2 at the specific spacing to the second pay-in reject banknote BL2.

The first and second pay-in reject banknotes BL1 and BL2 are thus temporarily retained in the sorting conveyance section 27.

Thereafter, out of the banknotes inserted by the user, the banknote pay-in/pay-out device 4 temporarily retains banknotes determined to be pay-in reject banknotes in the sorting conveyance section 27 in the above manner.

Figure 22:
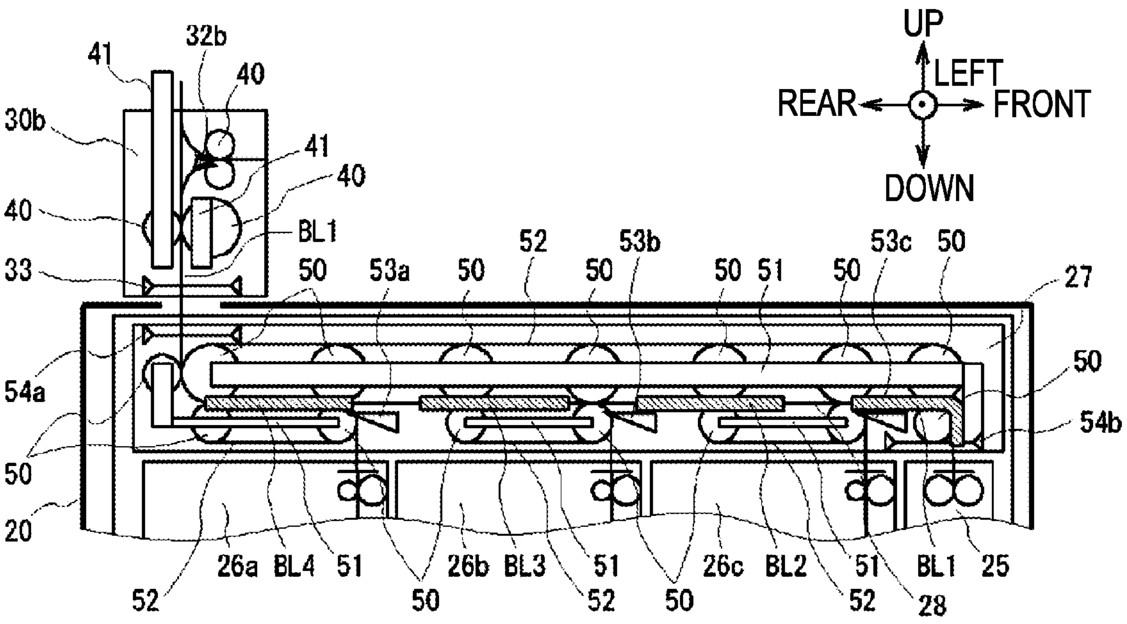
FIG. 22 is a left side view illustrating temporary retention of pay-in reject banknotes in the first exemplary embodiment (5).

As illustrated in FIG. 22, the number of pay-in reject banknotes temporarily retained in the sorting conveyance section 27 reaches the maximum number of retained notes at the point in time that the leading edge of the first pay-in reject banknote BL1 reaches the conveyance state detection sensor 54*b*.

FIG. 22 illustrates a state in which four pay-in reject banknotes BL1 to BL4, this being the maximum number of retained notes, are being temporarily retained in the sorting conveyance section 27.

When the number of pay-in reject banknotes being temporarily retained in the sorting conveyance section 27 reaches the maximum number of retained notes in this manner, or when pay-in count processing for the banknotes inserted into the pay-in/pay-out port section 21 is completed before the pay-in reject banknotes reach the maximum number of retained notes, the banknote pay-in/pay-out device 4 returns the pay-in reject banknotes that are temporarily retained in the sorting conveyance section 27 to the user.

1-11. Operation and Advantageous Effects

In the banknote pay-in/pay-out device 4 configured as described above, the sorting conveyance section 27 is installed inside the safe 20 provided at the lower side of the pay-in/pay-out port section 21 and the classification section 22, the pay-in/pay-out port section 21 and the classification section 22 are connected together by the front conveyance section 30*a*, and the classification section 22 and the sorting conveyance section 27 are connected together by the rear conveyance section 30*b*.

During pay-in count processing, the banknote pay-in/pay-out device 4 conveys banknotes inserted into the pay-in/pay-out port section 21 downstream to the classification section 22 to be classified, and the banknotes are conveyed downstream and stored in the temporary holding section 23 irrespective of the classification results.

In the banknote pay-in/pay-out device 4, the conveyance path switch 32*b* that switches the banknote conveyance destination three ways between the temporary holding section 23, the sorting conveyance section 27, and the classification section 22 is installed in the rear conveyance section 30*b* that is further downstream than the classification section 22.

Moreover, during pay-in count processing, when a banknote has been determined to be a pay-in reject banknote by the classification section 22, the banknote pay-in/pay-out device 4 interrupts pay-in count processing and switches the conveyance path switch 32*b* such that the banknote is conveyed from the temporary holding section 23 to the sorting conveyance section 27, and conveys the banknote to the sorting conveyance section 27 installed below the classification section 22, where it is retained.

The banknote pay-in/pay-out device 4 conveys counted banknotes to the banknote storage boxes 26 without passing the classification section 22, thereby enabling a conveyance path connecting together the front conveyance section 30*a* and the banknote storage boxes 26 to be omitted.

In this manner, in the banknote pay-in/pay-out device 4, the temporary holding section 23 and the pay-in/pay-out port section 21 are only connected through the rear conveyance section 30*b*, the classification section 22, and the front conveyance section 30*a*. Accordingly, during pay-in count processing, the banknote pay-in/pay-out device 4 is capable of temporarily retaining pay-in reject banknotes in the sorting conveyance section 27 until the pay-in count processing has been completed, and then replacing the pay-in reject banknotes in the pay-in/pay-out port section 21 to be returned to the user after pay-in count processing has been completed, without providing a separate conveyance path connecting directly between the temporary holding section 23 and the pay-in/pay-out port section 21 to convey pay-in reject banknotes to the pay-in/pay-out port section 21.

During pay-in count processing, the banknote pay-in/pay-out device 4 utilizes the sorting conveyance section 27 that functions as a conveyance path between the classification section 22 and the banknote storage boxes 26 (26*a* to 26*c*) in storage processing and pay-out transaction processing as a temporary retention destination for pay-in reject banknotes. Namely, during pay-in count processing, the banknote pay-in/pay-out device 4 utilizes the sorting conveyance section 27, hitherto unused in pay-in count processing, as the temporary retention destination for pay-in reject banknotes.

In this manner, the banknote pay-in/pay-out device 4 eliminates the need to provide a dedicated separate temporary storage box for pay-in reject banknotes, and enables an increase in costs when pay-in reject banknotes are temporarily retained to be kept to a minimum, and also enables an increase in the size of the banknote pay-in/pay-out device 4 to be avoided.

Since banknote pay-in/pay-out devices 4 generally include plural (for example three or more) banknote storage boxes 26 (26*a* to 26*c*) for respective banknote denominations, the sorting conveyance section 27 connecting them together has a length capable of retaining a certain number of pay-in reject banknotes or greater. Accordingly, many banknote pay-in/pay-out devices can utilize the sorting conveyance section as a temporary retention destination for pay-in reject banknotes as it is, without extending the sorting conveyance section.

In the banknote pay-in/pay-out device 4, the plural banknote storage boxes 26 (26*a* to 26*c*) and the sorting conveyance section 27 are installed below the classification section 22, thereby enabling an increase in the size of the banknote pay-in/pay-out device 4 and the safe 20 in the front-rear direction to be avoided.

The automated teller machine 1 configured as described above includes the customer interface 12 that receives operation relating to banknotes; the pay-in/pay-out port section 21 that takes in banknotes from the outside and dispenses banknotes to the outside; the classification section 22 that classifies the banknotes; the front conveyance section 30*a* that conveys the banknotes between the pay-in/pay-out port section 21 and the classification section 22; the banknote storage boxes 26 that are provided below the classification section 22, and that store normal banknotes determined to be normal by the classification section 22 from out of the banknotes inserted into the pay-in/pay-out port section 21; the sorting conveyance section 27 that is provided below the classification section 22, that sorts the normal banknotes into the banknote storage boxes 26 according to denomination, and that retains pay-in reject banknotes determined to be unsuitable for pay-in by the classification section 22; and the rear conveyance section 30*b* that conveys the banknotes between the classification section 22 and the sorting conveyance section 27.

Accordingly, the automated teller machine 1 provides the pay-in/pay-out port section 21 with a common feed-out port and collection port, simplifies the conveyance path, and also enables temporary retention in which pay-in reject banknotes are conveyed to the sorting conveyance section 27 without being conveyed to the pay-in/pay-out port section 21.

Figure 23:
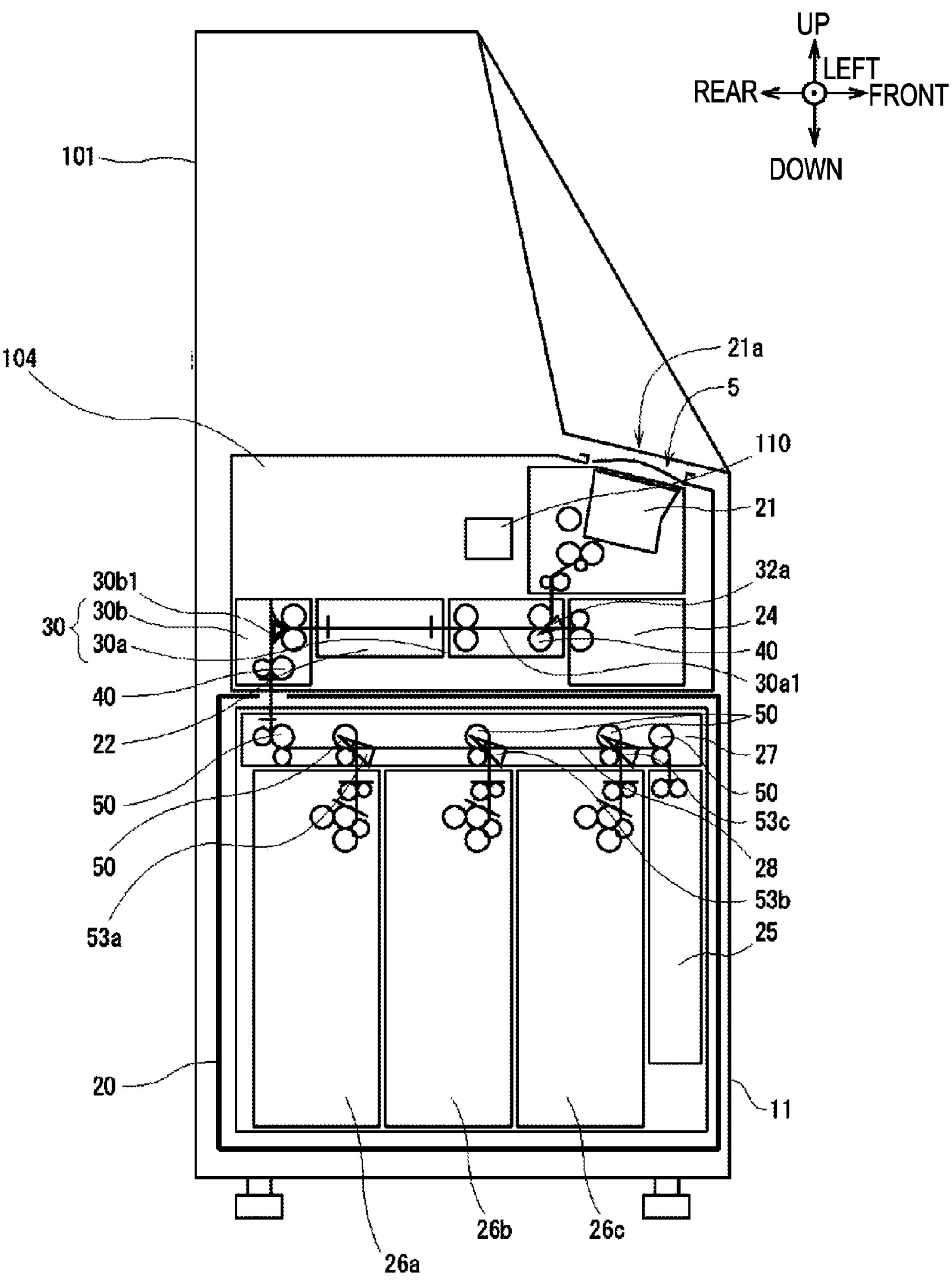
FIG. 23 is a left side view illustrating a configuration of a banknote pay-in/pay-out device according to a second exemplary embodiment.

2. Second Exemplary Embodiment 2-1. Automated Teller Machine and Banknote Pay-In/Pay-Out Device Configuration As illustrated in FIG. 23, a banknote pay-in/pay-out device 104 of an automated teller machine 101 according to a second exemplary embodiment has similar configuration to the banknote pay-in/pay-out device 4 of the automated teller machine 1 according to the first exemplary embodiment, except for in that a controller 110 differs from the controller 10, and the temporary holding section 23 is omitted.

2-2. Pay-In Count and Storage Processing

Next, explanation follows regarding operation during pay-in count and storage processing in the banknote pay-in/pay-out device 104, with reference to FIG. 24 to FIG. 27.

When a user inserts a cash card or the like into the automated teller machine 101, selects a pay-in transaction, and inputs a PIN or the like using the operation and display section 6, the banknote pay-in/pay-out device 104 opens the pay-in/pay-out port shutter 5 to adopt a state in which banknotes can be inserted.

Figure 24:
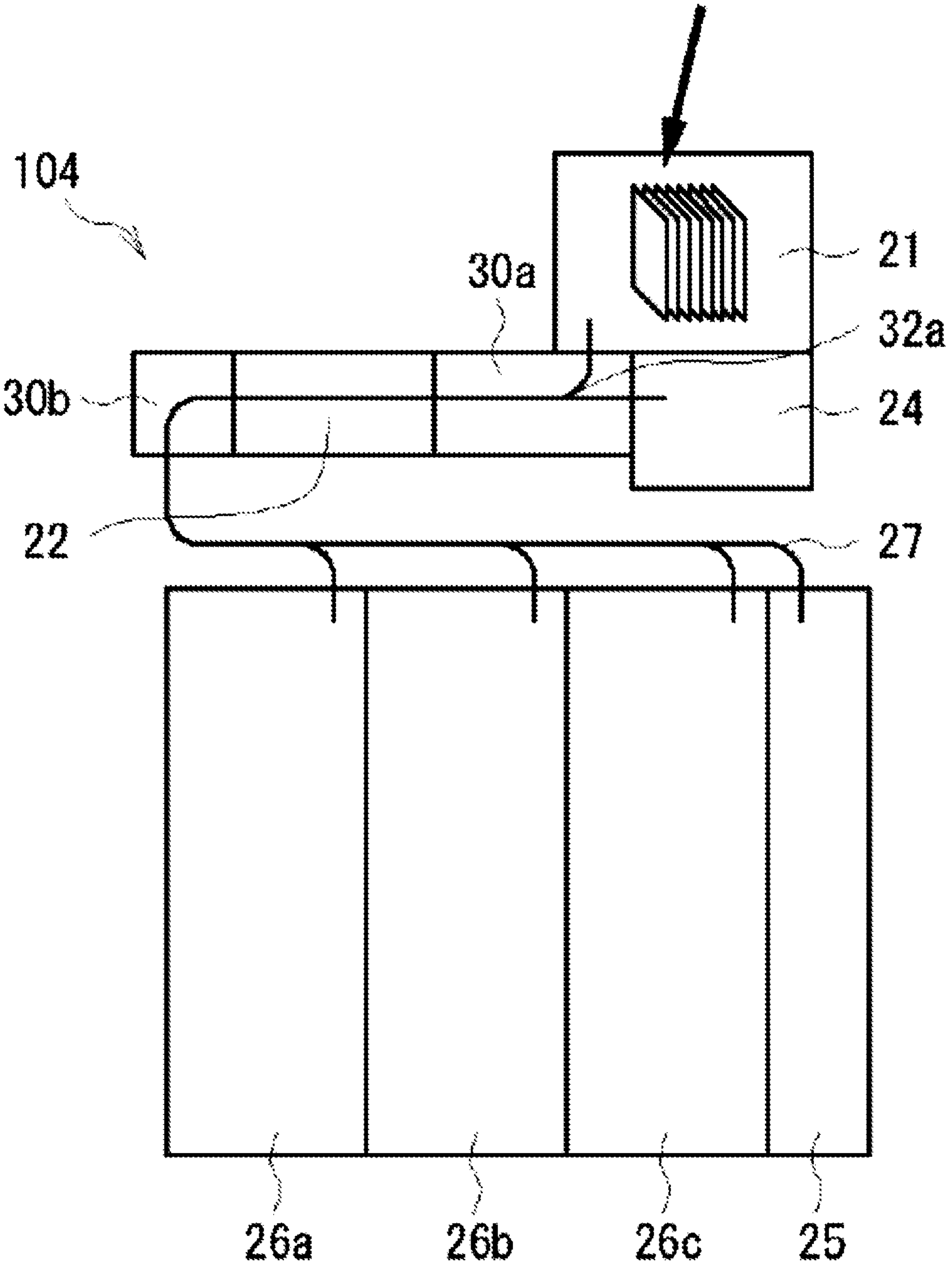
FIG. 24 is a schematic line drawing illustrating pay-in count and storage processing in the second exemplary embodiment (1).

Then, as illustrated in FIG. 24, when the user inserts banknotes into the pay-in/pay-out port section 21, a sensor inside the pay-in/pay-out port section 21 detects that banknotes have been inserted, and the banknote pay-in/pay-out device 104 closes the pay-in/pay-out port shutter 5 (FIG. 23).

Figure 25:
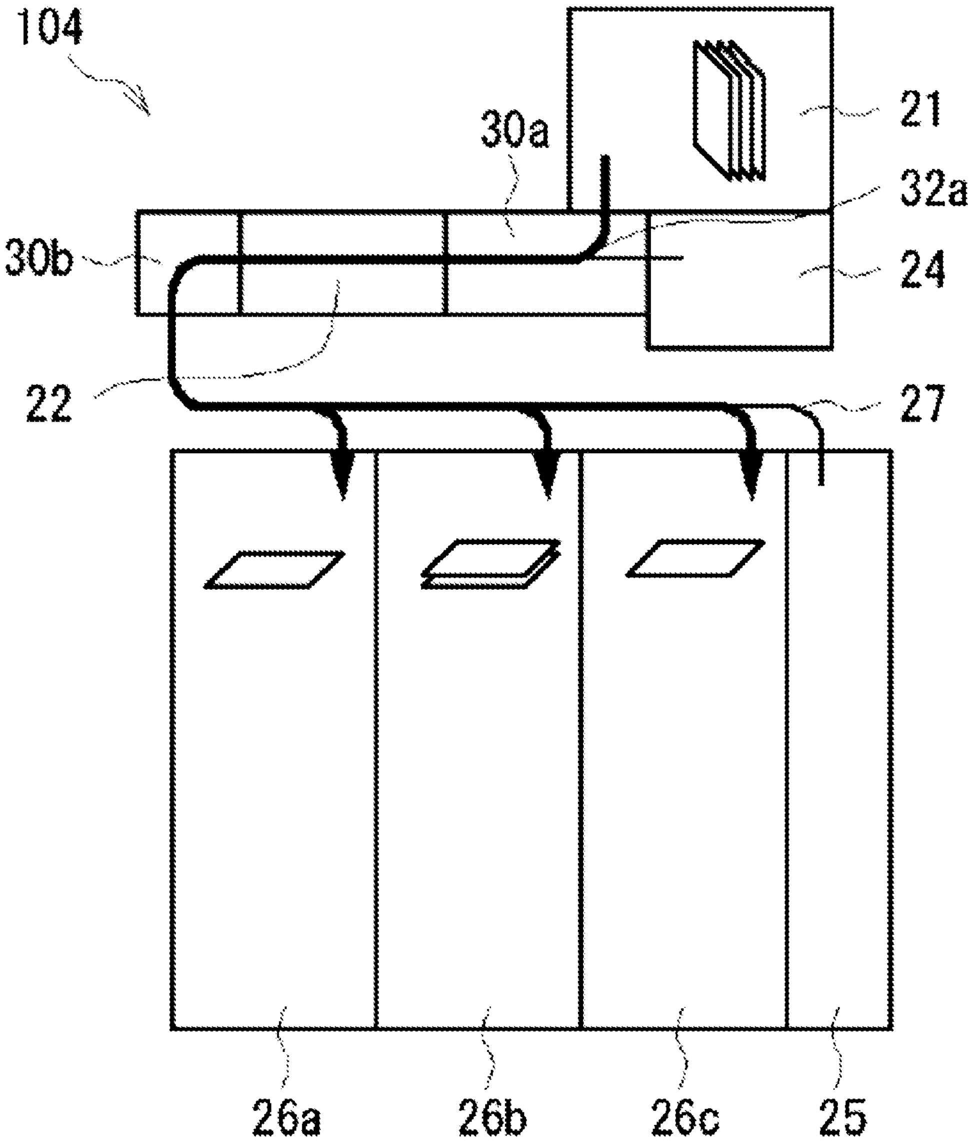
FIG. 25 is a schematic line drawing illustrating pay-in count and storage processing in the second exemplary embodiment (2).

As illustrated in FIG. 25, the banknotes inserted into the pay-in/pay-out port section 21 are then separated and fed out downstream one note at a time to the classification section 22 by the banknote pay-in/pay-out device 104.

When a banknote has been determined to be a storable banknote (namely a normal banknote) by the classification section 22, the banknote pay-in/pay-out device 104 switches the conveyance path switches 53 of the sorting conveyance section 27 according to the banknote denomination.

Namely, the banknote pay-in/pay-out device 104 switches the conveyance path switches 53 (53*a* to 53*c*) such that the banknote conveyance destination is the banknote storage box 26 (26*a* to 26*c*) corresponding to the denomination of the banknote. The banknote pay-in/pay-out device 104 thereby conveys the banknotes from the sorting conveyance section 27 to the banknote storage box 26 of the corresponding to denomination to be collected.

When this is performed, the banknote pay-in/pay-out device 104 counts each banknote collected in the banknote storage boxes 26 based on the denomination of the banknote as classified by the classification section 22.

Figure 26:
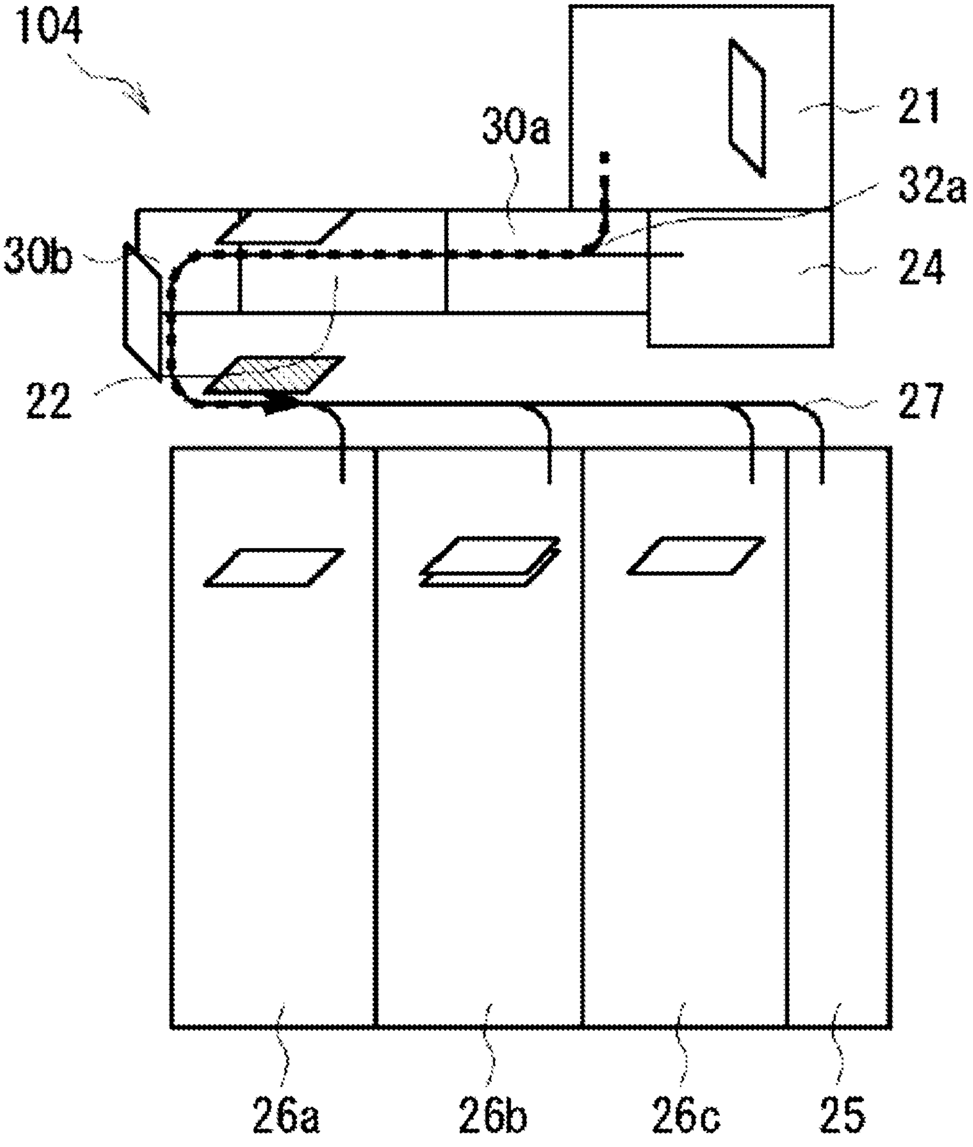
FIG. 26 is a schematic line drawing illustrating pay-in count and storage processing in the second exemplary embodiment (3).

However, when a banknote has been determined to be unacceptable as a pay-in banknote (namely a pay-in reject banknote) by the classification section 22, as illustrated in FIG. 26, the banknote pay-in/pay-out device 104 interrupts pay-in count processing, and interrupts feeding out of the banknotes from the pay-in/pay-out port section 21.

Figure 27:
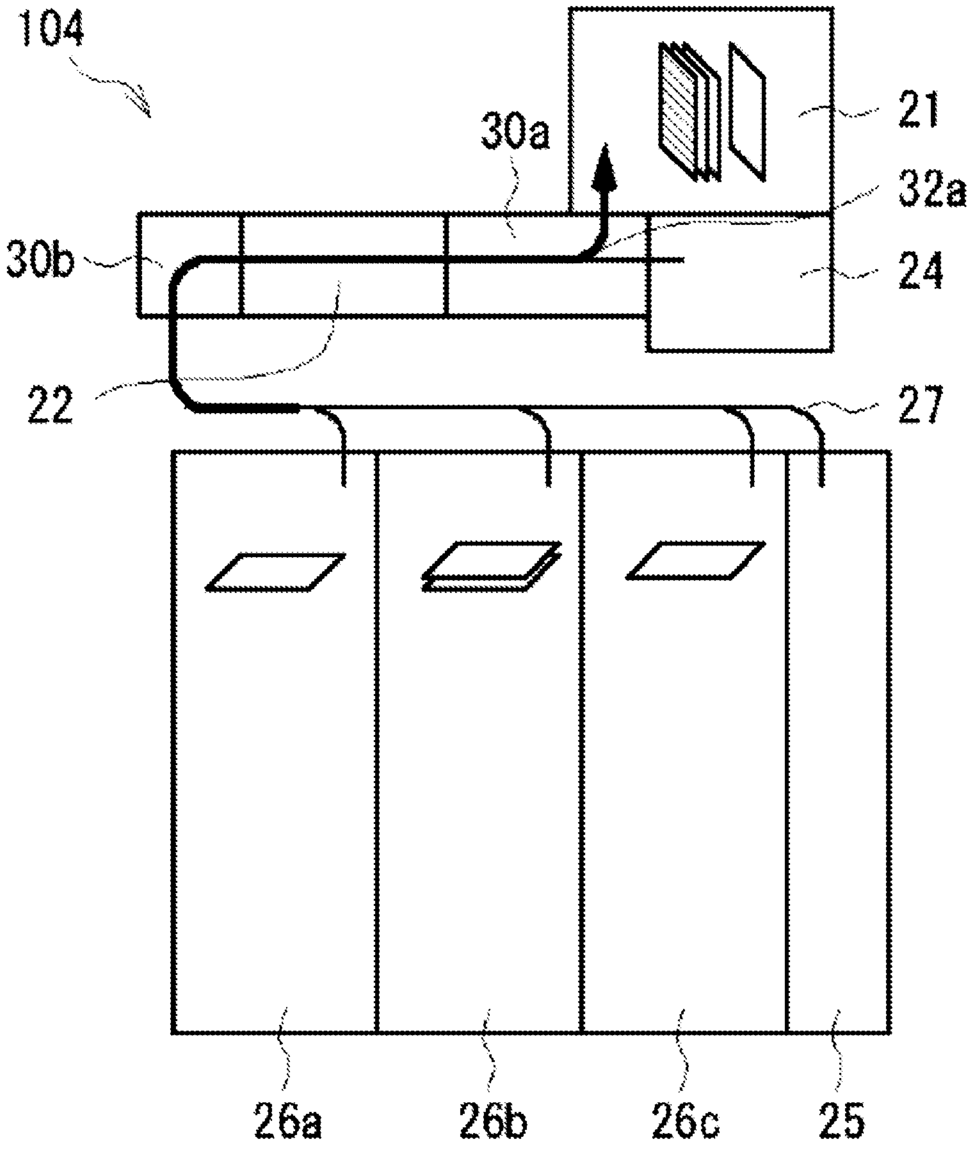
FIG. 27 is a schematic line drawing illustrating pay-in count and storage processing in the second exemplary embodiment (4).

As illustrated in FIG. 27, the banknote pay-in/pay-out device 104 then replaces the pay-in reject banknote positioned in the sorting conveyance section 27 or the rear conveyance section 30*b*, and any banknotes following the pay-in reject banknote, in the pay-in/pay-out port section 21 via the classification section 22, and returns the banknotes to the user together with any banknotes that have not been fed out and remain in the pay-in/pay-out port section 21.

When this is performed, the automated teller machine 101 displays guidance to take the pay-in reject banknotes on the operation and display section 6. The banknote pay-in/pay-out device 104 then opens the pay-in/pay-out port shutter 5 to adopt a state in which the pay-in reject banknotes can be taken.

Then, when the user takes the pay-in reject banknotes out from the pay-in/pay-out port section 21, the sensor inside the pay-in/pay-out port section 21 detects that the banknotes have been taken, and the banknote pay-in/pay-out device 104 closes the pay-in/pay-out port shutter 5. The banknote pay-in/pay-out device 104 then reopens the pay-in/pay-out port shutter 5 to adopt a state in which banknotes can be inserted.

Note that when the user reinserts the banknotes into the pay-in/pay-out port section 21, the sensor inside the pay-in/pay-out port section 21 detects that the banknotes have been inserted, and the banknote pay-in/pay-out device 104 closes the pay-in/pay-out port shutter 5. The banknote pay-in/pay-out device 104 repeats the above routine to count the inserted banknotes.

When the pay-in count processing has been completed, the automated teller machine 101 displays pay-in count results on the operation and display section 6, and confirms the pay-in count results with the user.

Note that the banknote pay-in/pay-out device 104 completes the pay-in count and storage processing when the user confirms the pay-in transaction by inputting an instruction to the operation and display section 6.

The banknote pay-in/pay-out device 104 otherwise performs similar operation to the banknote pay-in/pay-out device 4 during pay-in reject banknote withholding processing, pay-out transaction processing, and pay-out banknote withholding processing.

2-3. Operation and Advantageous Effects

Unlike the banknote pay-in/pay-out device 4, in the pay-in count and storage processing, the banknote pay-in/pay-out device 104 is not able to treat banknotes stored in a temporary holding section 23 prior to confirming the pay-in amount as banknotes belonging to the user, and treat banknotes stored in the banknote storage boxes 26 after confirming the pay-in amount as banknotes belonging to the automated teller machine 101. Namely, the banknote pay-in/pay-out device 104 is less capable than the banknote pay-in/pay-out device 4 of drawing a clear distinction between banknotes belonging to the user and banknotes belonging to the automated teller machine 101 in a pay-in transaction.

The banknote pay-in/pay-out device 104 also returns more banknotes to the user than the banknote pay-in/pay-out device 4, since pay-in reject banknotes are returned to the user together with banknotes that have not been fed out and remain in the pay-in/pay-out port section 21.

However, the banknote pay-in/pay-out device 104 omits the temporary holding section 23 (FIG. 2) of the banknote pay-in/pay-out device 4, thereby enabling a simpler configuration and a reduction in costs.

Accordingly, the simply configured and low cost automated teller machine 101 can be provided in cases in which the above operational limitations are not an issue, for example due to most transactions being pay-out transactions.

Moreover, since a similar configuration to that of the banknote pay-in/pay-out device 4 can be achieved simply by installing a temporary holding section 23 (FIG. 3) to the banknote pay-in/pay-out device 104 of the automated teller machine 101, the configuration and operation of the automated teller machine 101 can be simply modified according to the wishes of the user by installing the temporary holding section 23 in cases in which the automated teller machine 101 is to be used as a pay-in/pay-out device, removing the temporary holding section 23 in cases in which the automated teller machine 101 is to be used as a withdrawal-only device, or selecting whether or not the use the temporary holding section 23 based on operation by the user.

The banknote pay-in/pay-out device 104 according to the second exemplary embodiment otherwise exhibits substantially the same operation and advantageous effects as the banknote pay-in/pay-out device 4 according to the first exemplary embodiment.

3. Third Exemplary Embodiment

Figure 28:
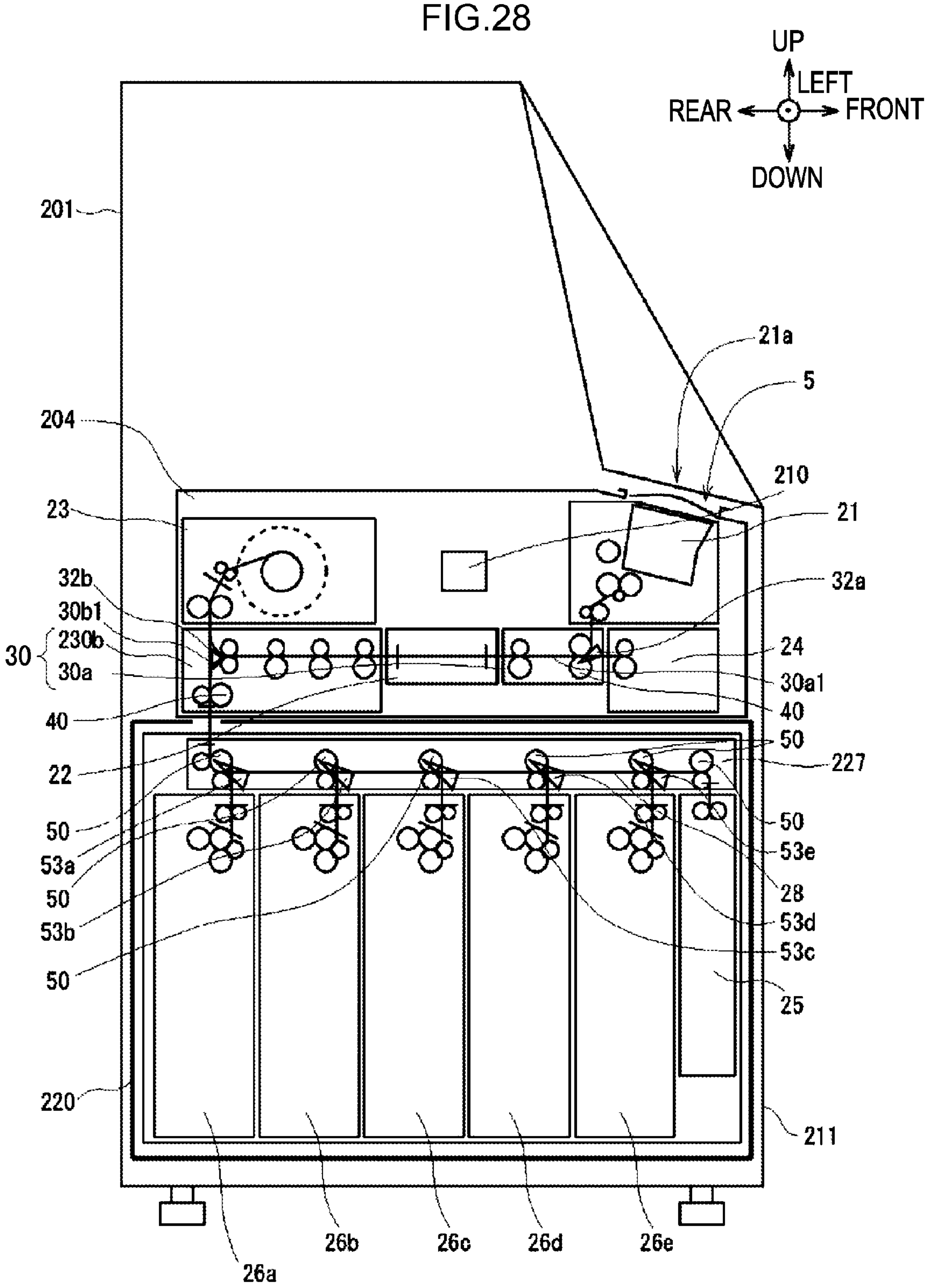
FIG. 28 is a left side view illustrating a configuration of a banknote pay-in/pay-out device according to a third exemplary embodiment.

3-1. Automated Teller Machine and Banknote Pay-In/Pay-Out Device Configuration As illustrated in FIG. 28, a banknote pay-in/pay-out device 204 of an automated teller machine 201 according to a third exemplary embodiment has similar configuration to that of the banknote pay-in/pay-out device 4 of the automated teller machine 1 according to the first exemplary embodiment, except for in the addition of banknote storage boxes 26*d* and 26*e*, and in that a controller 210 differs from the controller 10, a sorting conveyance section 227 differs from the sorting conveyance section 27, a rear conveyance section 230*b* differs from the rear conveyance section 30*b*, and a safe 220 differs from the safe 20.

The safe 220 is formed with a longer length in the front-rear direction than the safe 20. Five banknote storage boxes 26 (26*a* to 26*e*) are installed in a row in the front-rear direction inside the safe 220, and the withholding box 25 is installed in front of the banknote storage box 26*e*.

The sorting conveyance section 227 is formed with a longer length in the front-rear direction than the sorting conveyance section 27, and is connected to upper ends of the banknote storage boxes 26*a*, 26*b*, 26*c*, 26*d*, and 26*e* at five locations between the front end and the rear end.

The sorting conveyance section 227 is provided with conveyance path switches 53*a*, 53*b*, 53*c*, 53*d*, and 53*e* at the connection locations with the banknote storage boxes 26*a*, 26*b*, 26*c*, 26*d*, and 26*e*.

The five conveyance path switches 53 (53*a* to 53*e*) switch the banknote conveyance destination to one out of the rear conveyance section 230*b*, the banknote storage boxes 26, or the withholding box 25 by switching between connection and non-connection between the sorting conveyance section 227, the rear conveyance section 230*b*, the banknote storage boxes 26, and the withholding box 25, under control of the controller 110.

The rear conveyance section 230*b* is formed with a longer length in the front-rear direction than the rear conveyance section 30*b*. The rear conveyance path 30*b*1 of the rear conveyance section 230*b* accordingly has a length that enables a banknote to be classified and the conveyance path switch 32*b* to be switched to the temporary holding section 23 or the sorting conveyance section 27 based on the classification results by the time that the banknote heading from front to rear during a pay-in transaction reaches the conveyance path switch 32*b* after passing through the classification section 22.

3-2. Pay-In Count Processing

Figure 29:
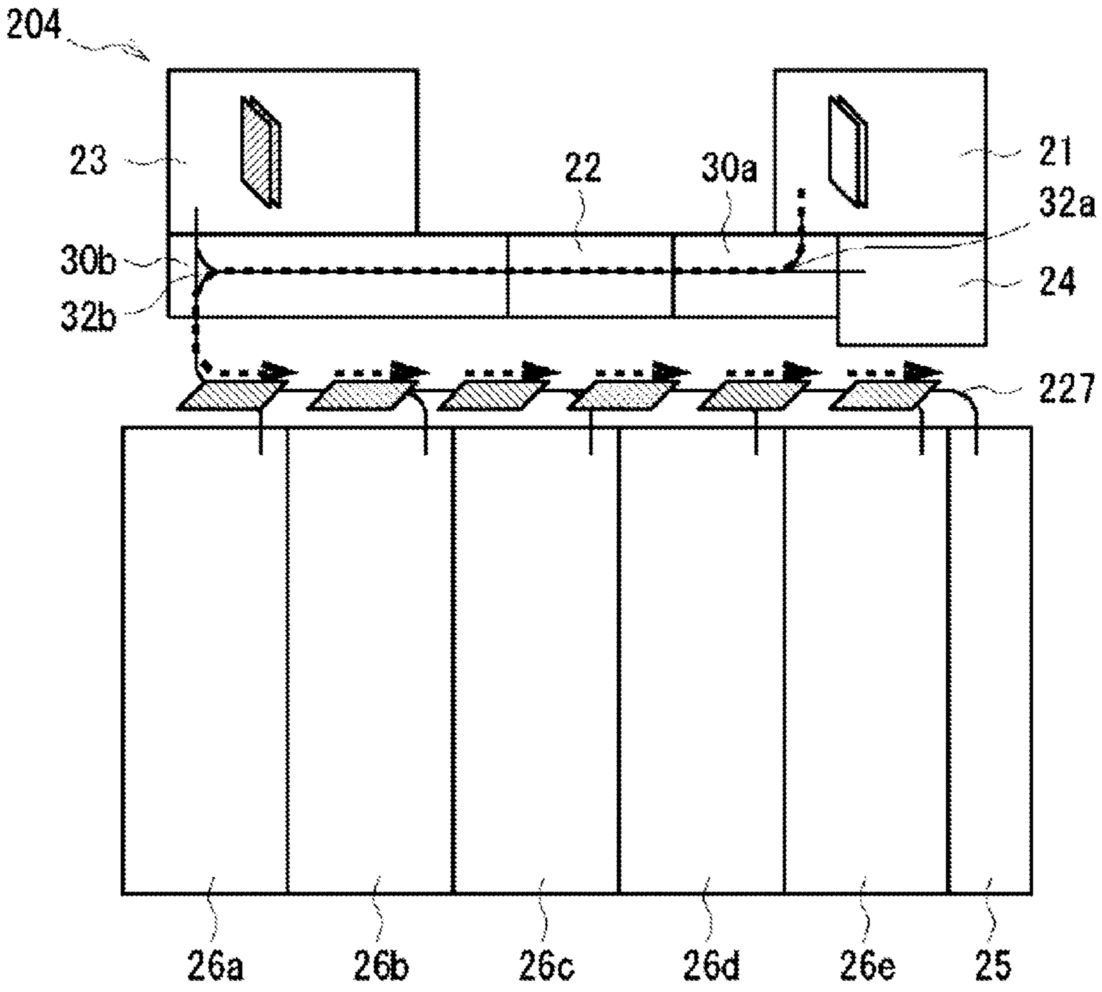
FIG. 29 is a schematic line drawing illustrating pay-in count processing in the third exemplary embodiment.

When a banknote has been determined to be acceptable as a pay-in banknote (namely a normal banknote) by the classification section 22, as illustrated in FIG. 29, the banknote pay-in/pay-out device 204 switches the conveyance path switch 32*b* such that the conveyance destination of the normal banknote is the temporary holding section 23, and conveys the normal banknote from the classification section 22 to the temporary holding section 23, where it is stored.

However, when a banknote has been determined to be unacceptable as a pay-in banknote (namely a pay-in reject banknote) by the classification section 22, without interrupting the pay-in count processing, the banknote pay-in/pay-out device 204 switches the conveyance path switch 32*b* such that the conveyance destination of the pay-in reject banknote is the sorting conveyance section 227, and conveys the pay-in reject banknote from the classification section 22 to the sorting conveyance section 227 where it is temporarily retained prior to being replaced in the pay-in/pay-out port section 21.

FIG. 29 illustrates a state in which six pay-in reject banknotes, this being the maximum number of retained notes, are being temporarily retained in the sorting conveyance section 227.

The banknote pay-in/pay-out device 204 then repeats the pay-in count processing in a similar manner to the banknote pay-in/pay-out device 4. The banknote pay-in/pay-out device 204 otherwise performs similar operation to the banknote pay-in/pay-out device 4 during pay-in reject banknote withholding processing, storage processing, pay-out transaction processing, and pay-out banknote withholding processing.

3-3. Operation and Advantageous Effects

In the banknote pay-in/pay-out device 204, the front-rear direction length of the sorting conveyance section 227 is longer than that of the sorting conveyance section 27. This thereby enables the banknote pay-in/pay-out device 204 to increase the number of pay-in reject banknotes that can be stored in the sorting conveyance section 227 in comparison to the banknote pay-in/pay-out device 4.

In the banknote pay-in/pay-out device 204, the front-rear direction length of the rear conveyance section 230*b* is longer than that of the rear conveyance section 30*b*. This thereby enables the banknote pay-in/pay-out device 204 to switch the conveyance path switch 32*b* to the temporary holding section 23 or to the sorting conveyance section 27 by the time that a banknote passing the classification section 22 reaches the conveyance path switch 32*b*.

Accordingly, out of the banknotes inserted into the pay-in/pay-out port section 21, the banknote pay-in/pay-out device 204 can perform pay-in count processing continuously and without interruption while sorting normal banknotes to the temporary holding section 23 and sorting pay-in reject banknote to the sorting conveyance section 227.

The banknote pay-in/pay-out device 204 according to the third exemplary embodiment otherwise exhibits substantially the same operation and advantageous effects as the banknote pay-in/pay-out device 4 according to the first exemplary embodiment.

4. Other Exemplary Embodiments

Figure 30:
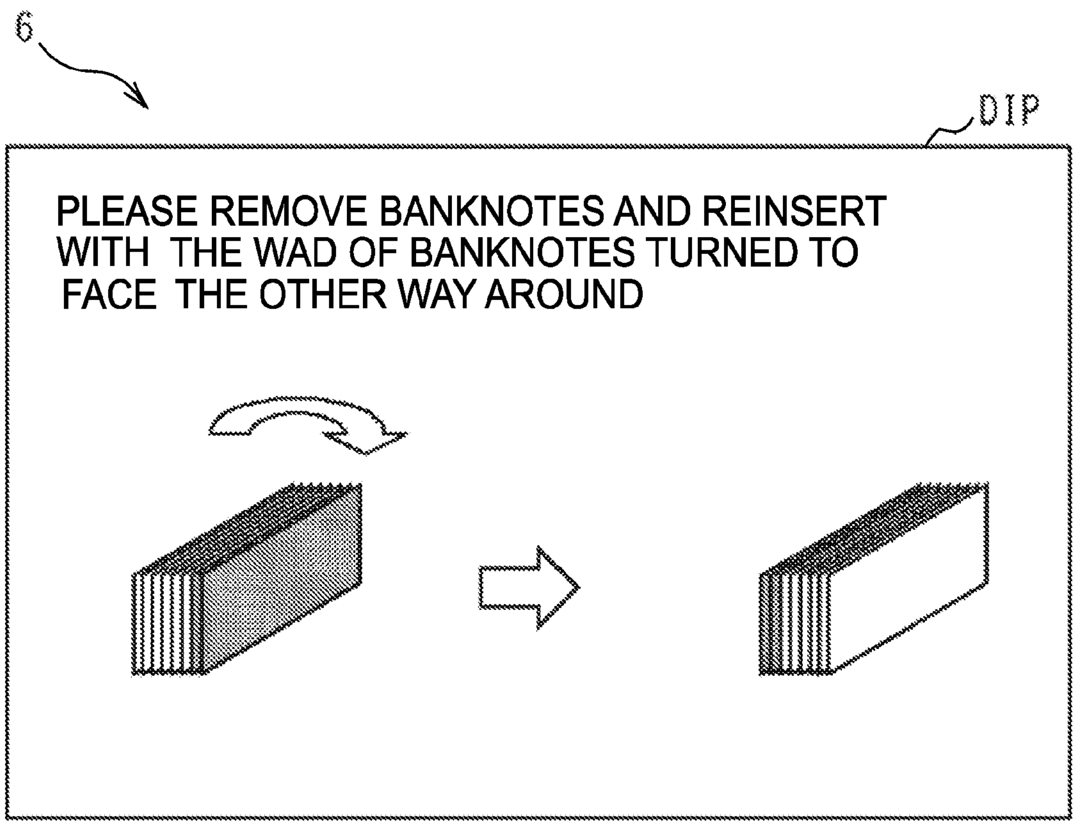
FIG. 30 is a schematic line drawing illustrating a turn-around prompt screen.

In the pay-in count processing of the first exemplary embodiment described above, explanation has been given regarding a case in which only pay-in reject banknotes, from which normal banknotes and uncounted banknotes have been removed, are returned to the user. The present invention is not limited thereto, and uncounted banknotes may also be returned to the user in addition to pay-in reject banknotes. Similar applies to the third exemplary embodiment. In such cases, configuration may, for example, be made such that the operation and display section 6 displays the turn-around prompt screen DIP illustrated in FIG. 30, or provides audio guidance, advising the user that the wad of banknotes in the pay-in/pay-out port section 21 should be turned to face the other way around and reinserted in the pay-in/pay-out port section 21.

Moreover, configuration may be made such that when the user has inserted a small number of banknotes, uncounted banknotes are returned to the user together with any pay-in reject banknotes, and when the user has inserted a large number of banknotes, only pay-in reject banknotes are returned to the user.

In the pay-in reject banknote withholding processing (FIG. 13) described above, the pay-in reject banknotes may be conveyed directly to the withholding box 25 and collected without passing the temporary holding section 23. Similar applies to the third exemplary embodiment.

In the pay-in reject banknote withholding processing (FIG. 14) described above, configuration may be made such that when one of the banknote storage boxes 26 (26*a* to 26*c*) is set as a withholding box, pay-in reject banknotes are collected in the banknote storage box 26 set as the withholding box instead of in the withholding box 25. Similar also applies to the second and third exemplary embodiments.

In the storage processing (FIG. 15) described above, storage reject banknotes may be collected in the withholding box 25 instead of the reject box 24. Similar applies to the third exemplary embodiment.

In the pay-out banknote withholding processing (FIG. 17) described above, in cases in which one of the banknote storage boxes 26 (26*a* to 26*c*) is set as a withholding box, forgotten banknotes may be collected in the banknote storage box 26 set as the withholding box instead of the withholding box 25. Similar also applies to the second and third exemplary embodiments.

In the pay-out banknote withholding processing (FIG. 17) described above, out of the forgotten banknotes, banknotes that can be reused in pay-out may be stored in the banknote storage boxes 26 (26*a* to 26*c*). Similar also applies to the second and third exemplary embodiments.

Namely, in cases in which setting is made to reuse forgotten banknotes, the banknote pay-in/pay-out device 4 switches the conveyance path switches 53 (53*a* to 53*c*) according to the denomination of the banknotes in the sorting conveyance section 27, and collects the banknotes in the banknote storage boxes 26 (26*a* to 26*c*) by denomination.

However, when a banknote has been determined to be a banknote unsuitable for reuse (namely, a non-reusable banknotes out of the forgotten banknotes) by the classification section 22, the banknote pay-in/pay-out device 4 switches the conveyance path switches 53 (53*a* to 53*c*) such that the banknote conveyance destination is the withholding box 25, and the banknote that is unsuitable for reuse is conveyed to the withholding box 25, where it is collected.

In the pay-in count and storage processing (FIG. 26) described above, configuration may be made such that when a banknote is present on the sorting conveyance section 27 ahead of a pay-in reject banknote, this banknote is collected in the banknote storage boxes 26 (26*a* to 26*c*) according to its denomination.

In the exemplary embodiments described above, the classification section 22, the front conveyance section 30*a*, and the rear conveyance section 30*b* may be configured together as a single classification unit.

In the first exemplary embodiment described above, the sorting conveyance section 27 may be installed further to the upper side than the safe 20. Although such a configuration makes positioning of conveyance paths between the respective conveyance path switches 53*a*, 53*b*, and 53*c* and the banknote storage boxes 26*a*, 26*b*, and 26*c* more complicated than in the banknote pay-in/pay-out device 4, it enables the safe 20 to house only the banknote storage boxes 26 and withholding box 25 that store banknotes. Similar also applies to the second and third exemplary embodiments.

In the first embodiment described above, explanation has been given regarding a case in which the sorting conveyance section 27 is utilized as a temporary retention section that temporarily retains pay-in reject banknotes. The present invention is not limited thereto, and a location such as one of the plural banknote storage boxes 26 (26*a* to 26*c*), or the withholding box 25, may be utilized as a temporary retention section, as long as it is a location capable of conveying a banknote in both directions with respect to the classification section 22 and capable of temporarily retaining pay-in reject banknotes. Similar also applies to the second and third exemplary embodiments.

Moreover, in the exemplary embodiments described above, explanation has been given regarding cases in which the present invention is applied to a banknote pay-in/pay-out device provided to an automated teller machine. The present invention is not limited thereto and may be applied to various other devices as long as they are devices that temporarily retain pay-in reject banknotes that have been determined to be unsuitable for pay-in out of banknotes inserted during pay-in.

In the exemplary embodiments described above, explanation has been given regarding cases in which the present invention is applied in a case in which banknotes BL are classified as a medium in an automated teller machine that performs cash transactions. The present invention is not limited thereto, and may, for example, be applied to various devices that classify thin paper sheet shaped media such as bonds, certificates, shopping vouchers, coupons, entrance tickets and the like.

The present invention is not limited to the first to the third exemplary embodiments described above, nor to the other exemplary embodiments described above. Namely, the scope of application of the present invention covers any combination of some or all of the first to the third exemplary embodiments and the other exemplary embodiments described above, and exemplary embodiments extrapolated therefrom.

In the exemplary embodiments described above, explanation has been given regarding cases in which the banknote pay-in/pay-out device 4, 104, or 204 serving as a banknote pay-in/pay-out device is configured by the pay-in/pay-out port section 21 serving as a pay-in/pay-out port section, the classification section 22 serving as a classification section, the front conveyance section 30*a* serving as a first conveyance section, the banknote storage boxes 26 serving as banknote storage boxes, the sorting conveyance section 27 serving as a sorting conveyance section, and the rear conveyance section 30*b* serving as a second conveyance section.

The present invention is not limited thereto, and a banknote pay-in/pay-out device may be configured by pay-in/pay-out port sections, classification sections, first conveyance sections, banknote storage boxes, sorting conveyance sections, and second conveyance sections of various other configurations.

Moreover, in the exemplary embodiments described above, explanation has been given regarding cases in which the automated teller machine 1, 101, or 201 serving as a banknote transaction device is configured by the customer interface 12 serving as a customer interface, the pay-in/pay-out port section 21 serving as a pay-in/pay-out port section, the classification section 22 serving as a classification section, the front conveyance section 30*a* serving as a first conveyance section, the banknote storage boxes 26 serving as banknote storage boxes, the sorting conveyance section 27 serving as a sorting conveyance section, and the rear conveyance section 30*b* serving as a second conveyance section.

The present invention is not limited thereto, and a banknote transaction device may be configured by customer interfaces, pay-in/pay-out port sections, classification sections, first conveyance sections, banknote storage boxes, sorting conveyance sections, and second conveyance sections of various other configurations.

INDUSTRIAL APPLICABILITY

The present invention may be employed in a wide range of devices such as automated teller machines in which out of banknotes inserted during pay-in, pay-in reject banknotes that have been determined to be unsuitable for pay-in are returned to a user.

The disclosure of Japanese Patent Application No. 2013-190585 is incorporated in its entirety into the present specification by reference.

All cited documents, patent applications and technical standards mentioned in the present specification are incorporated by reference in the present specification to the same extent as if the individual cited document, patent application, or technical standard was specifically and individually indicated to be incorporated by reference.

EXPLANATION OF THE REFERENCE NUMERALS

1, 101, 201 automated teller machine
2 card insertion/removal port
3 receipt issue port
4, 104, 204 banknote pay-in/pay-out device
5 pay-in/pay-out port shutter
6 operation and display section
7 ten-key
8 main controller
8A memory section
10, 110, 210 controller
11 casing
12 customer interface
20, 220 safe
21 pay-in/pay-out port section
21*a* pay-in/pay-out port
22 classification section
23 temporary holding section
24 reject box
25 withholding box
26 banknote storage boxes
27, 227 sorting conveyance section
28 sorting conveyance path
30, 230 conveyance section
30*a* front conveyance section
30*b*, 230*b* rear conveyance section
30*a*1 front conveyance path
30*b*1 rear conveyance path
32, 53 conveyance path switches
33, 54 conveyance state detection sensor
40, 50 conveyance rollers
41, 51 conveyance guide
52 conveyor belts
BL banknote

The invention claimed is:

1. A banknote pay-in/pay-out device comprising:

a pay-in/pay-out port section that takes in banknotes from the outside and dispenses banknotes to the outside;

a classification section that classifies the banknotes;

a first conveyance section that conveys the banknotes between the pay-in/pay-out port section and the classification section;

banknote storage boxes that are provided below the classification section, and that store normal banknotes determined to be normal by the classification section from the banknotes inserted into the pay-in/pay-out port section;

a sorting conveyance section that includes a conveyance path, that sorts the normal banknotes into the banknote storage boxes according to denomination, and that retains, on the conveyance path, a pay-in reject banknote determined to be unsuitable for pay-in by the classification section;

a second conveyance section that conveys the banknotes between the classification section and the sorting conveyance section; and a controller that, after the pay-in reject banknote has been retained on the conveyance path in the sorting conveyance section, controls the sorting conveyance section to convey the pay-in reject banknote to the pay-in/pay-out port section for return.

2. The banknote pay-in/pay-out device of claim 1, further comprising a temporary holding section that temporarily holds the banknotes.

3. The banknote pay-in/pay-out device of claim 2, further comprising:

a second conveyance path switch that switches a conveyance destination of the banknotes to either the temporary holding section or the sorting conveyance section, wherein the second conveyance section conveys the banknotes between the classification section and either the temporary holding section or the sorting conveyance section according to the switching state of the second conveyance path switch.

4. The banknote pay-in/pay-out device of claim 3, wherein:

a length of the second conveyance section from the classification section to the second conveyance path switch is formed such that a banknote that has passed the classification section reaches the second conveyance path switch before the second conveyance path switch can be switched based on a determination result of the classification section; and wherein the controller controls the second conveyance path switch to switch to the temporary holding section, and thereafter the pay-in reject banknote is stored in the temporary holding section, and the feed out of the banknotes from the pay-in/pay-out port section is interrupted, and thereafter the controller causes the pay-in reject banknote to be conveyed from the temporary holding section to the sorting conveyance section.

5. The banknote pay-in/pay-out device of claim 3, wherein:

a length of the second conveyance section from the classification section to the second conveyance path switch is formed such that the second conveyance path switch can be switched based on a determination result of the classification section before a banknote that has passed the classification section reaches the second conveyance path switch; and when a banknote has been determined to be a normal banknote by the classification section, the controller controls the second conveyance path switch to switch to the temporary holding section and causes the normal banknote to be conveyed from the classification section to the temporary holding section, and when a banknote has been determined to be a pay-in reject banknote by the classification section, the controller controls the second conveyance path switch to switch to the sorting conveyance section and causes the pay-in reject banknote to be conveyed from the classification section to the sorting conveyance section.

6. The banknote pay-in/pay-out device of claim 3, wherein the temporary holding section stores banknotes by gripping the banknotes so as to be aligned between tapes and wrapping the banknotes sequentially onto a drum, and feeds out the banknotes being stored to the outside by rotating the drum in the opposite direction to during storage.

7. The banknote pay-in/pay-out device of claim 2, wherein the temporary holding section and the pay-in/pay-out port section are only connected through the second conveyance section, the classification section, and the first conveyance section.

8. The banknote pay-in/pay-out device of claim 2, wherein the controller causes all of the banknotes in the pay-in/pay-out port section to be conveyed to the temporary holding section in cases in which the number of pay-in reject banknotes retained on the conveyance path in the sorting conveyance section has reached a maximum number of retained notes, and causes the banknotes being held in the temporary holding section to be conveyed to the pay-in/pay-out port section after the pay-in reject banknotes are conveyed to the pay-in/pay-out port section.

9. The banknote pay-in/pay-out device of claim 8, wherein the controller causes banknotes from a wad in which the pay-in reject banknotes have been moved to the rear side in order of feeding out from the pay-in/pay-out port section to be fed out from the pay-in/pay-out port section, and causes the banknotes to be conveyed to the classification section.

10. The banknote pay-in/pay-out device of claim 8, wherein the temporary holding section is configured so as to be detachable from the banknote pay-in/pay-out device.

11. The banknote pay-in/pay-out device of claim 10, wherein in cases in which the temporary holding section is mounted to the banknote pay-in/pay-out device, the controller causes pay-in reject banknotes to be conveyed to the sorting conveyance section after the pay-in reject banknotes are stored in the temporary holding section, and in cases in which the temporary holding section is not mounted to the banknote pay-in/pay-out device, the controller causes pay-in reject banknotes to be conveyed to the pay-in/pay-out port section.

12. The banknote pay-in/pay-out device of claim 1, wherein the sorting conveyance section is provided between the classification section and the banknote storage boxes.

13. The banknote pay-in/pay-out device of claim 1, wherein the controller causes the normal banknotes to be stored in the banknote storage boxes according to denomination, and when a pay-in reject banknote has been determined by the classification section, the controller causes the pay-in reject banknote to be conveyed to the pay-in/pay-out port section after the feed out of the banknotes from the pay-in/pay-out port section is interrupted.

14. The banknote pay-in/pay-out device of claim 1, further comprising a withholding box that stores banknotes in cases in which banknotes collected in the pay-in/pay-out port section are not taken within a specific period of time.

15. The banknote pay-in/pay-out device of claim 14, wherein the withholding box is provided aligned in a left-right direction with the banknote storage boxes, and stores banknotes sorted by the sorting conveyance section.

16. The banknote pay-in/pay-out device of claim 1, further comprising a reject box that stores pay-out reject banknotes determined to be unsuitable for pay-out by the classification section when paying out banknotes stored in the banknote storage boxes.

17. The banknote pay-in/pay-out device of claim 16, further comprising a first conveyance path switch that switches a conveyance destination of the banknotes to the pay-in/pay-out port section or the reject box, wherein:

the first conveyance section conveys the banknotes between the classification section and either the pay-in/pay-out port section or the reject box according a switching state of the first conveyance path switch; and when a banknote is determined to be a banknote suitable for pay-out by the classification section, the controller controls the first conveyance path switch to switch to the pay-in/pay-out port section and causes the banknote to be conveyed from the classification section to the pay-in/pay-out port section, and when a banknote is determined to be a pay-out reject banknote by the classification section, the controller controls the first conveyance path switch to switch to the reject box and causes the pay-out reject banknote to be conveyed from the classification section to the reject box.

18. A banknote transaction device comprising:

a customer interface that receives operation relating to banknotes;

a pay-in/pay-out port section that takes in banknotes from the outside and dispenses banknotes to the outside;

a classification section that classifies the banknotes;

a first conveyance section that conveys the banknotes between the pay-in/pay-out port section and the classification section;

banknote storage boxes that are provided below the classification section, and that store normal banknotes determined to be normal by the classification section from the banknotes inserted into the pay-in/pay-out port section;

a sorting conveyance section that includes a conveyance path, that sorts the normal banknotes into the banknote storage boxes according to denomination, and that retains, on the conveyance path, a pay-in reject banknote determined to be unsuitable for pay-in by the classification section;

a second conveyance section that conveys the banknotes between the classification section and the sorting conveyance section; and a controller that, after the pay-in reject banknote has been retained on the conveyance path in the sorting conveyance section, controls the sorting conveyance section to convey the pay-in reject banknote to the pay-in/pay-out port section for return.

* * * * *